(12) United States Patent
Funawatari et al.

(10) Patent No.: US 7,210,156 B2
(45) Date of Patent: Apr. 24, 2007

(54) DISK CARTRIDGE

(75) Inventors: Takatsugu Funawatari, Miyagi (JP); Susumu Shibagaki, Kanagawa (JP); Naoki Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 44 days.

(21) Appl. No.: 10/532,728

(22) PCT Filed: Aug. 16, 2004

(86) PCT No.: PCT/JP2004/011754

§ 371 (c)(1),
(2), (4) Date: Apr. 27, 2005

(87) PCT Pub. No.: WO2005/022533

PCT Pub. Date: Mar. 10, 2005

(65) Prior Publication Data
US 2005/0273801 A1 Dec. 8, 2005

(30) Foreign Application Priority Data
Aug. 28, 2003 (JP) ............................. 2003-305310
Aug. 28, 2003 (JP) ............................. 2003-305312

(51) Int. Cl.
*G11B 23/03* (2006.01)
(52) U.S. Cl. ...................................... 720/739; 720/741
(58) Field of Classification Search ................ 720/734, 720/738, 739, 741
See application file for complete search history.

(56) References Cited

U.S. PATENT DOCUMENTS

| 6,590,858 | B2* | 7/2003 | Inoue | 720/742 |
| 6,728,199 | B2* | 4/2004 | Obata et al. | 720/738 |
| 6,874,159 | B2* | 3/2005 | Inoue | 720/728 |
| 7,000,240 | B2* | 2/2006 | Inoue | 720/741 |

(Continued)

FOREIGN PATENT DOCUMENTS

JP   2003-109343   4/2003
JP   2003-109345   4/2003

OTHER PUBLICATIONS

U.S. Appl. No. 10/529,635, filed Mar. 31, 2005, Funawatari et al.
U.S. Appl. No. 10/530,286, filed Apr. 5, 2005, Funawatari et al.
U.S. Appl. No. 10/532,728, filed Apr. 27, 2005, Funawatari et al.

*Primary Examiner*—William J Klimowicz
(74) *Attorney, Agent, or Firm*—Oblon, Spivak, McClelland, Maier & Neustadt, P.C.

(57) ABSTRACT

A disk cartridge storing an optical disk includes a cartridge main body including a lower shell formed with a first opening and an upper shell abutted against the lower shell, a rotation wheel rotatably stored in the cartridge main body and storing the optical disk and formed with a second opening to cause the stored optical disk to face outside, and a pair of shutter plates positioned between the lower shell and the rotation wheel so that when the first and second openings coincide with each other in operative association with the rotation of the rotation wheel, these openings are opened. The rotation wheel is formed with an engagement groove adapted to engage the peripheral edge of one shutter plate.

20 Claims, 17 Drawing Sheets

U.S. PATENT DOCUMENTS 7,017,170 B2 * 3/2006 Iwaki et al. ................. 720/741
2001/0055270 A1 * 12/2001 Obata et al. ................. 369/291
2002/0031080 A1 * 3/2002 Inoue ........................ 369/291
2003/0174640 A1 * 9/2003 Iwaki et al. ................. 369/291

* cited by examiner

DISK CARTRIDGE

TECHNICAL FIELD

The present invention generally relates to a disk cartridge in which a disk used as a recording medium is housed, and more particularly to a disk cartridge configured to prevent flexing of a shutter member provided on a cartridge body in which a disk is housed.

This application claims the priority of the Japanese Patent Application Nos. 2003-305310 and 2003-305312, both filed on Aug. 28, 2003, the entirety of which is incorporated by reference herein.

BACKGROUND ART

A disk cartridge is disclosed in the Japanese Patent Application Laid Open No. 2003-109343. In the disk cartridge, a write/read opening formed in a cartridge body is closed by a pair of shutter plates coupled with each other. In this disk cartridge, if the pair of shutter plates closing the opening in the cartridge body is forcibly pushed, for example, a clearance will arise between the shutter plates and the perimeter of a first opening in the cartridge body. Dust or the like will possibly enter the cartridge body through the clearance. The dust or the like adhering to a disk encased in the cartridge body will make impossible correct write or read of information signals to or from the disk.

To design a smaller disk cartridge which houses an optical disk having a smaller diameter and which adopts the same recording format as that in the disk encased in the above disk cartridge, it is not sufficient to reduce only the dimensions thereof because, for maintaining the compatibility of a disk recorder and/or player with various disk cartridges different in size from one another, the write/read opening, in which an optical pickup comes when a disk cartridge is loaded into the disk recorder and/or player, may not be reduced in dimensions but should have the same size as that of a write/read opening through which write and/or read is made to and/or from a disk cartridge having the dimensions. Therefore, the write/read opening will take a large part of the entire size of such a small disk cartridge and thus the disk cartridge itself will have any lower rigidity.

If the cartridge body is more easily flexible because of the lower rigidity, for example, a clearance is more likely to arise between the shutter member and cartridge body and dust or the like will easily come into the cartridge body. Also, the cartridge body and shutter member will possibly be flexibly deformed and touch a disk in the cartridge body. If the disk is damaged by the dust or the like adhering to the disk and by the cartridge body or shutter member touching the disk, no correct write or read information signals to or from the disk will be possible.

DISCLOSURE OF THE INVENTION

Accordingly, the present invention has an object to overcome the above-mentioned drawbacks of the conventional disk cartridge.

The present invention has another object to provide a disk cartridge configured to prevent a shutter member thereof from being flexibly deformed and thus prevent dust or the like from invading a cartridge body.

The above object can be attained by providing a disk cartridge including, according to the present invention, a cartridge body including a lower shell having formed therein a first opening for write and/or read and an upper shell butt-joined to the lower shell; a rotation wheel housed rotatably in the cartridge body and which houses a disk and has formed therein a second opening corresponding to the fist opening and through which the housed disk is exposed to outside; and a shutter mechanism provided between the lower shell and rotation wheel and including a pair of shutter plates which are pivoted in conjunction with the rotation of the rotation wheel and which uncovers the first and second openings when the latter coincide with each other. The rotation wheel has formed therein an engagement recess in which at least one of the shutter plates is engaged.

In the disk cartridge according to the present invention, since one of the shutter plates is engaged in the engagement recess in the rotation wheel, the shutter plates can be prevented from being flexibly deformed and thus dust or the like be prevented from invading the cartridge body.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The disk cartridge according to the present invention will be described below with reference to the accompanying drawings. The disk cartridge according to the present invention is still compatible with, and can thus be loaded into, a disk recorder and/or player in which the disk cartridge having the standard size as that disclosed in the aforementioned Japanese Patent Application Laid Open No. 2003-109343.

The disk cartridge having the standard size, as disclosed in the above Japanese Unexamined Patent Application Publication, houses an optical disk whose diameter is about 12 cm. The disk cartridge according to the present invention houses an optical disk whose diameter is smaller than that of the optical disk encased in the standard-sized disk cartridge. Being smaller in diameter than the optical disk in the standard-sized disk cartridge, the optical disk encased in the disk cartridge according to the present invention is smaller in recording capacity than the optical disk in the standard-sized disk cartridge but the disk cartridge according to the present invention has a smaller contour and thus more excellent in portability than the standard-sized disk cartridge.

Figure 1:
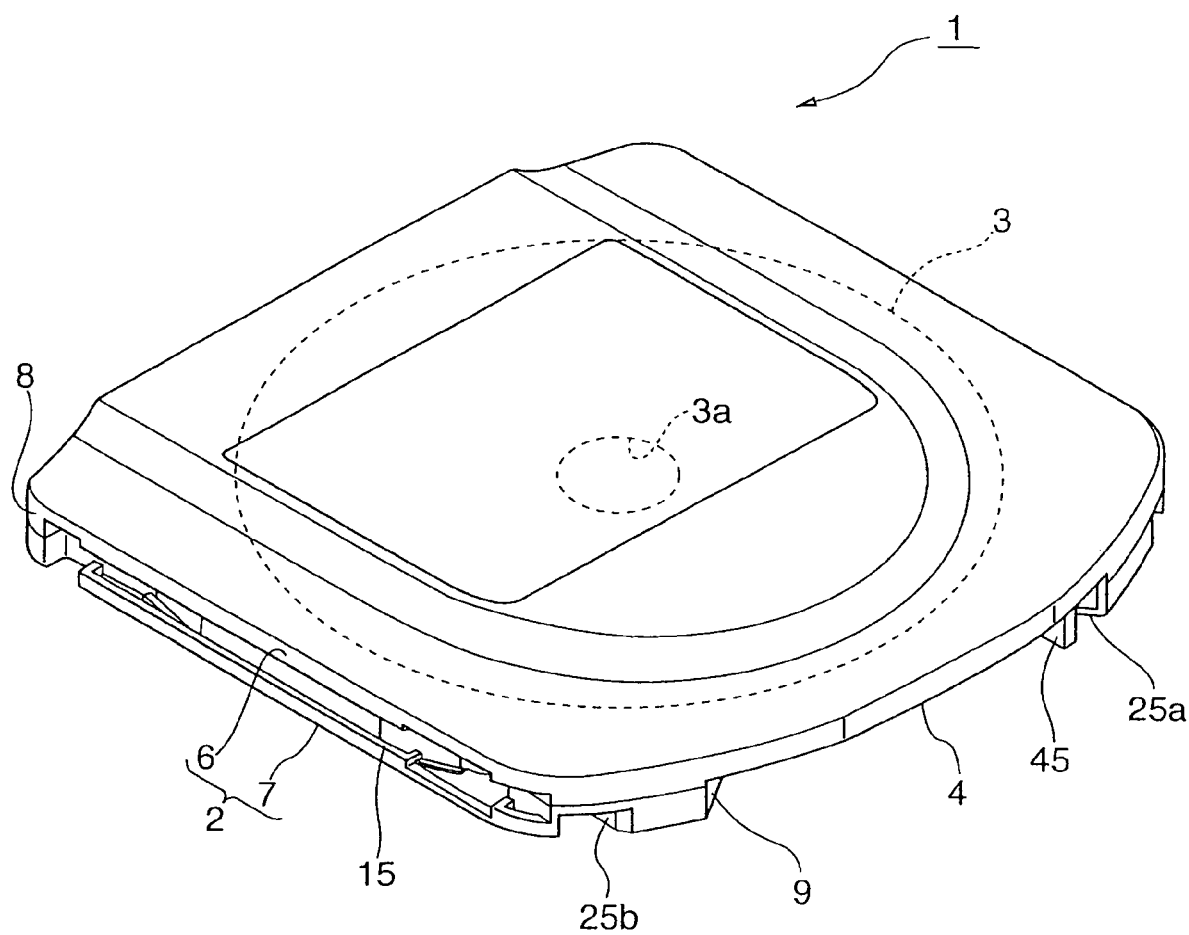
FIG. 1 is a perspective view, from the upper shell, of the disk cartridge according to the present invention.
Figure 2:
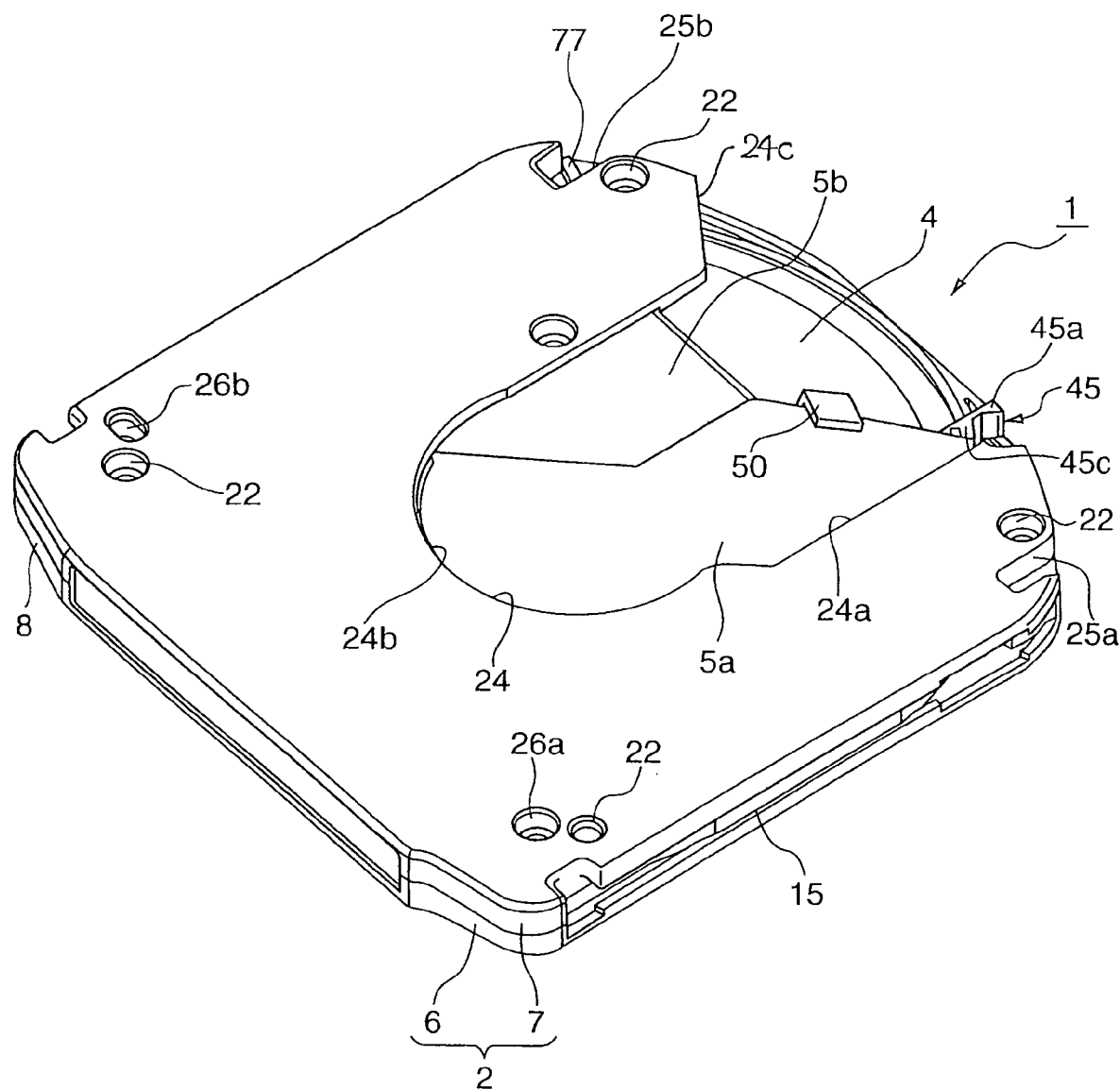
FIG. 2 is a perspective view, from the lower shell, of the disk cartridge according to the present invention.
Figure 3:
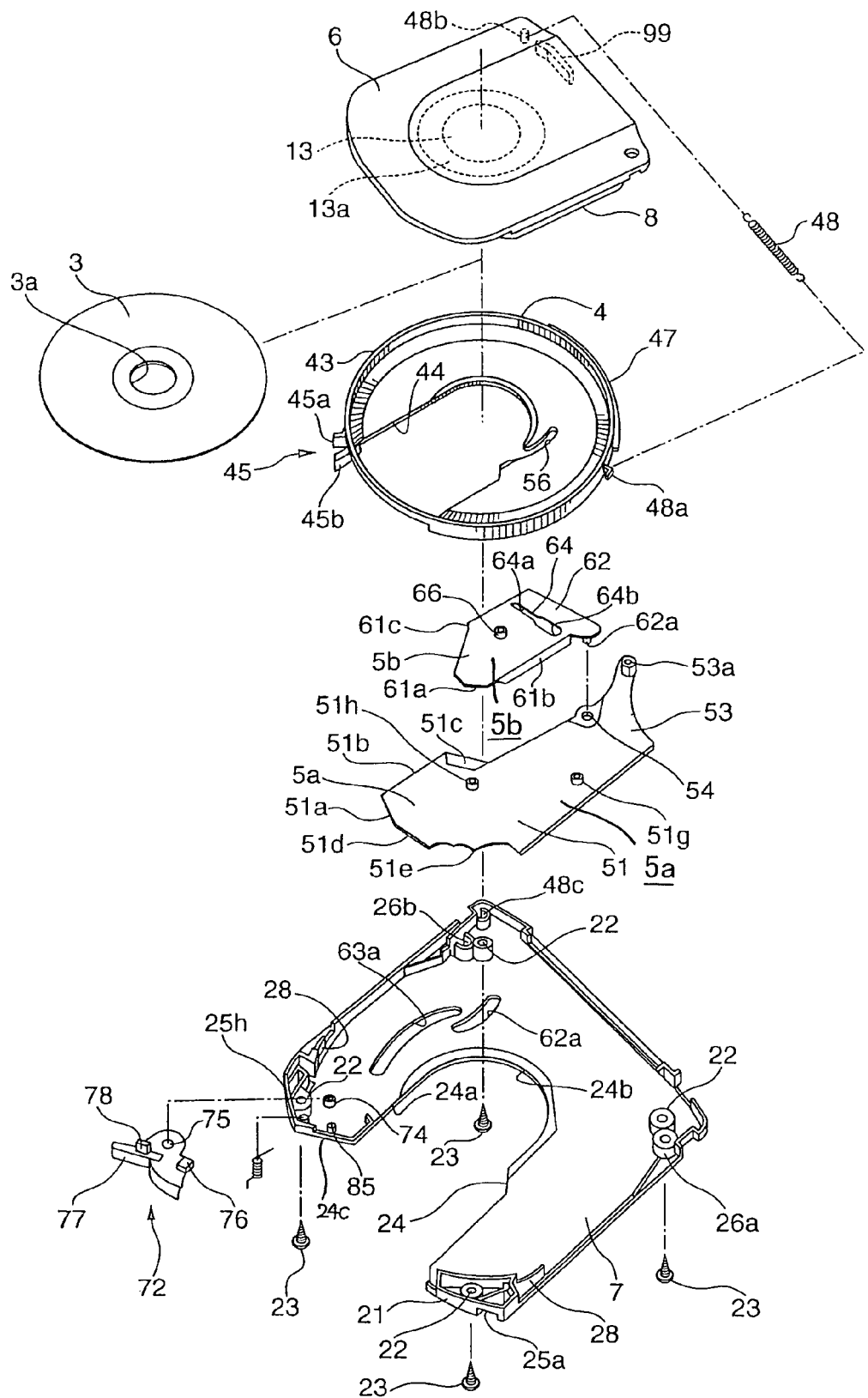
FIG. 3 is an exploded perspective view of the disk cartridge according to the present invention.

As shown in FIGS. 1 to 3, the disk cartridge according to the present invention, generally indicated with a reference numeral 1, includes a cartridge body 2. The cartridge body 2 incorporates a rotation wheel 4 in which an optical disk 3 is housed, and a pair of first and second shutter plates 5a and 5b forming together a shutter mechanism. The cartridge body 2 is formed from a pair of upper and lower shells 6 and 7 butt-joined to each other.

The optical disk 3 used in the disk cartridge 1 according to the present invention has formed in the center thereof a center hole 3a in which a disk rotation driving mechanism of the disk recorder and/or player is to be engaged. The optical disk 3 used in the present invention may be a read-only optical disk formed from a substrate having preformed thereon a bit pattern corresponding to information signals, a rewritable optical disk whose recording layer is formed from a phase-change material or a recordable optical disk whose recording layer is formed from an organic dye or the like. Further, according to the present invention, the recording medium may not only be an optical disk but also a magneto-optical disk, magnetic disk or the like.

Figure 4:
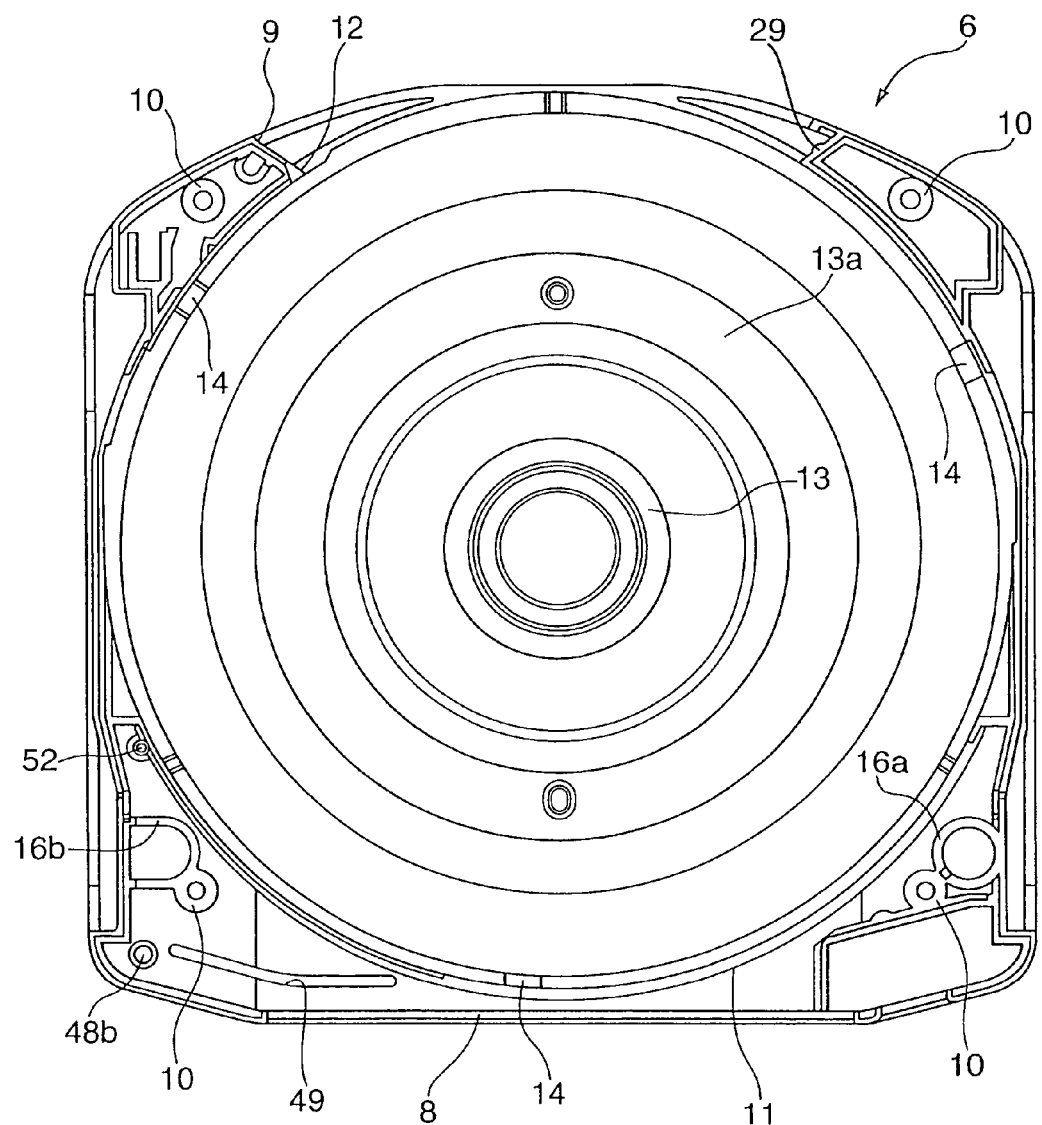
FIG. 4 is a plan view, from inside the upper shell, of the disk cartridge.

As shown in FIG. 4, the upper shell 6 of the cartridge body 2 is formed by injection molding of a synthetic resin using a molding machine. The upper shell 6 is formed to have a generally rectangular plane and a generally circular front end at which the disk cartridge 1 is first introduced into the disk recorder and/or player. Further, the upper shell 6 has a peripheral wall 8 forming the lateral side of the cartridge body 2. The peripheral wall 8 is upright along the peripheral edge of the main surface of the upper shell 6.

In addition, the peripheral wall 8 has formed in the central portion of the front side thereof a first pickup admission concavity 9 for introduction of an optical pickup of the disk recorder and/or player into the disk cartridge 1. Also, the peripheral wall 8 has formed, for example, at each corner thereof a boss 10 having formed therein a screw hole for joining the upper shell 6 to the lower shell 7.

Figure 5:
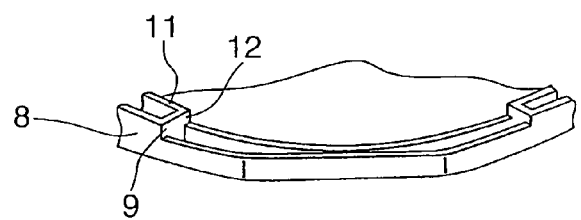
FIG. 5 is a perspective view of the substantial portion, at the front side, of the upper shell.

Inside the peripheral wall 8, a generally circular inner wall 11 inside which the rotation wheel 4 is placed is formed to inscribe the peripheral wall 8 as shown in FIG. 5. The inner wall 11 is to house the rotation wheel 4 rotatably. The inner wall 11 has formed in the central portion of the front side a second pickup admission concavity 12 for introduction of the optical pickup of the disk recorder and/or player. The inner wall 11 houses the rotation wheel 4 rotatably and guides the latter being rotated. When the rotation wheel 4 is housed as above, the main surface of the upper shell 6 defines a disk compartment along with the rotation wheel 4. Also, a lifter 14 to lift the rotation wheel 4 is formed at the inner base of the inner wall 11 and near the second pickup admission concavity 12. The lifter 14 lifts the rotation wheel 4 toward the lower shell 7 when the first and second shutter plates 5a and 5b cover together a first opening 24.

Nearly at a generally central portion of the inner surface of the upper shell 6, there is installed a clamping plate 13 which holds the optical disk 3 along with a disk table provided in the disk rotation drive of the disk recorder and/or player. The clamping plate 13 is installed with a fixing ring 13a. More specifically, being held between the fixing ring 13a and the nearly central portion of the inner surface of the upper shell 6, the clamping plate 13 is fixed to the nearly central portion of the inner surface of the upper shell 6 by welding or otherwise securing the fixing ring 13a. A centering piece provided at the center of the disk table is engaged in the center hole 3a in the optical disk 3, and the optical disk 3 is held between the disk table and clamping plate 13 to be rotatable inside the disk compartment.

Note that on the inner surface of the upper surface 6, there are further formed a rising wall 16a forming a location hole 26a in the lower shell 7 and a rising wall 16b forming an alignment hole 26b.

Figure 6:
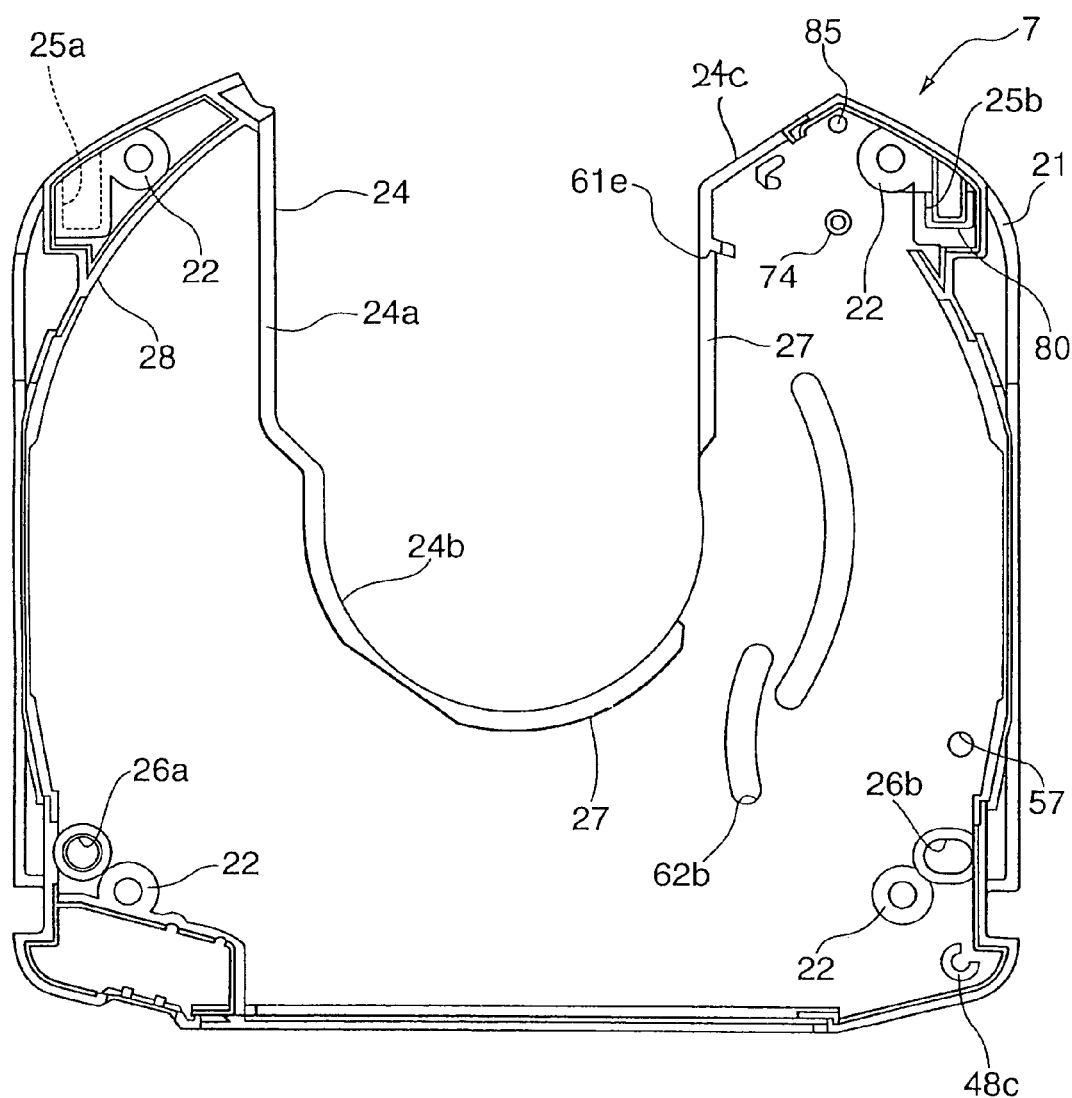
FIG. 6 is a plan view, from inside the lower shell, of the disk cartridge.

The lower shell 7 which is to joined to the upper shell 6 constructed as above is formed by injection molding of a synthetic resin by means of the molding machine like the upper shell 6, as shown in FIGS. 2, 3 and 6. The lower shell 7 has a main surface which is generally rectangular. Of this main surface, a front-side portion is formed generally circular. The disk cartridge 1 is to be inserted first at this front-side portion thereof into the disk recorder and/or player. The lower shell 7 has a peripheral wall 21 extending upright along the peripheral edge of the main surface of the lower shell 7 and which forms the lateral side of the cartridge body 2, and an inner wall 28 formed to inscribe the peripheral wall 21.

The lower shell 7 has formed in the central portion of the front side of the peripheral wall 21 a first opening 24 through which the optical pickup and disk table are introduced. The first opening 24 includes a generally rectangular optical pickup admission opening 24a extending from the open end of the front side of the lower shell 7 and through which the signal recording surface of the optical disk 3 is partially exposed in a range between the inner and outer radii of the optical disk 3, and a rotation driving opening 24b contiguous to the optical pickup admission opening 24a and through which the center hole 3a of the optical disk 3 is exposed to outside. That is, the write/read opening (optical pickup admission opening) 24a has a sufficient size to introduce the optical pickup of the disk recorder and/or player into the cartridge body 2, and also the rotation driving opening 24b has a sufficient size to introduce the disk table provided in the disk rotation driving mechanism of the disk recorder and/or player into the cartridge body 2. Further, at one opening end of the optical pickup admission opening 24a, there is formed a taper portion 24c inclining in a direction of increasing the width of the opening end. The taper portion 24c is to house a to-be-operated member 45 of the rotation wheel 4, which is in a position for the first and second shutter plates 5a and 5b to uncover the first opening 24. The to-be-operated member 45 will be described in detail later.

At each of the lateral edges of the write/read opening 24a and rotation driving opening 24b, both forming the first opening 24, there is formed a projection 27 which prevents dust or the like from invading the cartridge body 2 when the pair of first and second shutter plates 5a and 5b is covering the first opening 24.

Also, on the rear side of the peripheral wall 21, there are formed bosses 22 corresponding to the aforementioned bosses 10 formed on the upper shell 6. Each of the bosses 10 has the screw hole formed therein as mentioned above, and also each of the bosses 22 has formed therein a through-hole where are to be aligned with the corresponding one of the screw holes in the bosses 10 when the upper and lower shells 6 and 7 are butt-joined to each other. As shown in FIG. 2, the upper and lower shells 6 and 7 are joined to each other with screws 23 passed through the through-holes in the bosses 22 on the lower shell 7 and driven into the screw holes in the bosses 10 on the upper shell 6.

Figure 7:
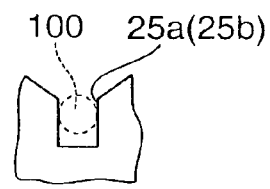
FIG. 7 is a plan view of the substantial portion, explaining the relation between an insertion guide recess and insertion guide pin.

Further, on the front side of the lower shell 7, there are formed insertion guide recesses 25a and 25b in which insertion guide members of the disk recorder and/or player are engaged when the disk cartridge 1 is inserted into the disk recorder and/or player. The insertion guide recesses 25a and 25b are formed widest at the opening ends thereof for easier introduction of insertion guide pins 100 as shown in FIG. 7. It should be noted that the innermost portion of each of the insertion guide recesses 25a and 25b may be formed to have a width nearly equal to the outside diameter of the insertion guide pin 100. Thus, when placed on the cartridge mount in the disk recorder and/or player, the disk cartridge 1 can be positioned plane-directionally to prevent backlash. Also, there is provided a locking mechanism 71 in a position near one (25b) of the insertion guide recesses as will be described in detail later. The locking mechanism 71 includes a locking member 72. An unlocking piece 77 of the locking member 72 is engaged in the insertion guide recess 25a. The insertion guide pin 100 engaged in the insertion guide recess 25b works as an unlocking pin which will press the unlocking piece 77.

Moreover, near one of the corners at the rear side of the lower shell 7, there is formed the location hole 26a which is a reference hole for positioning and loading the disk cartridge 1 in the disk recorder and/or player, as shown in FIGS. 2 and 6. Also, the adjusting alignment hole 26b is formed near the other corner.

Note that on both lateral sides of the cartridge body 2 formed from the upper and lower shells 6 and 7 butt-joined to each other, parallel to the direction of introduction into the disk recorder and/or player, there are formed guide recesses 15 extending from the front to rear end, as shown in FIGS. 1 and 2. The guide recesses 15 guide the disk cartridge 1 being introduced into the disk recorder and/or player.

Figure 8:
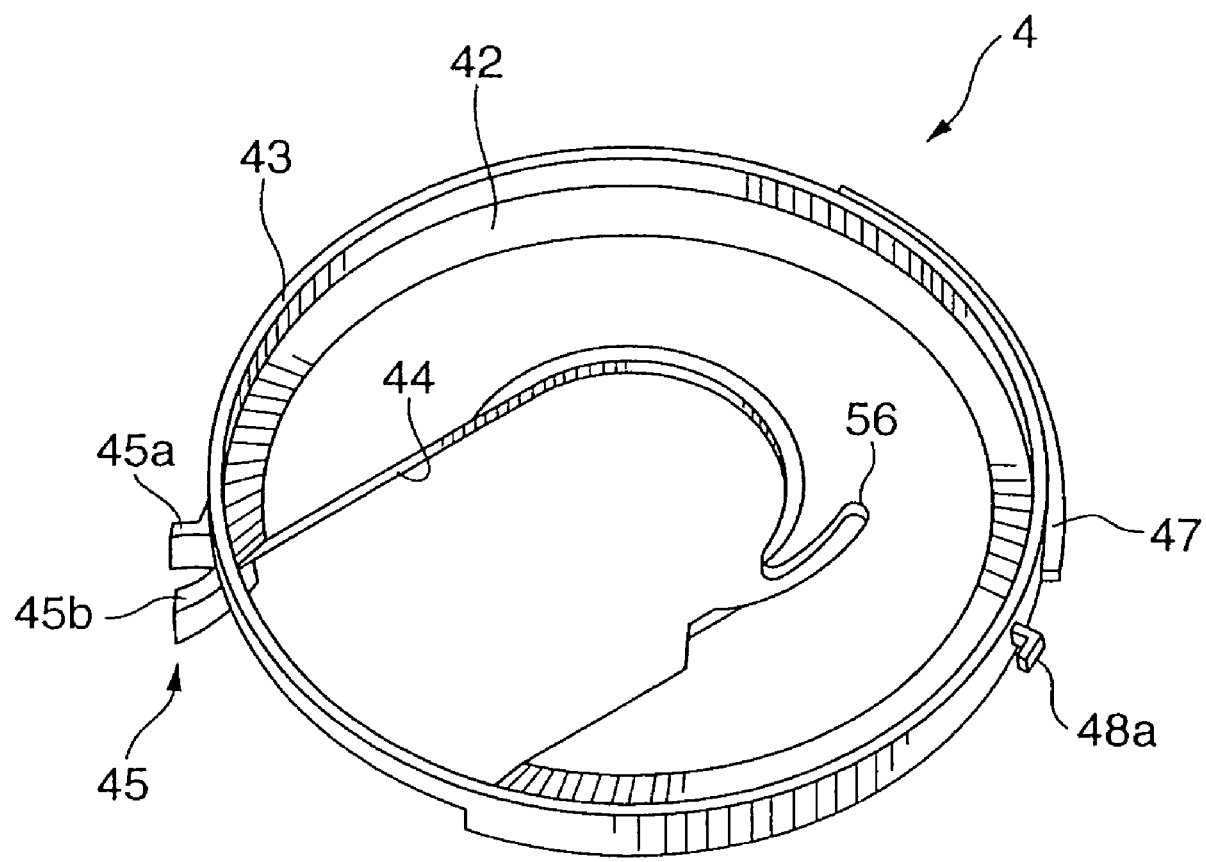
FIG. 8 is a perspective view, from the side at which an optical disk is to be inserted, of the rotation wheel.
Figure 9:
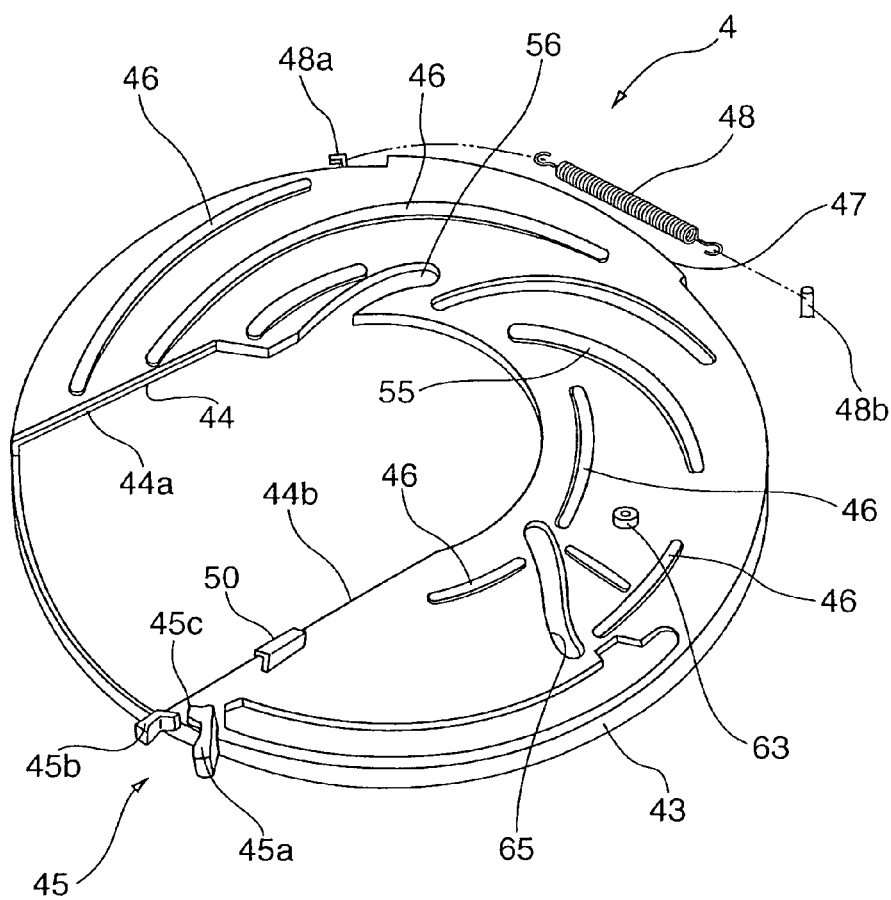
FIG. 9 is a perspective view, from the surface of the rotation wheel, of the lower shell.

The upper and lower shells 6 and 7, when butt-joined to each other, define together inside the inner wall 11 a compartment for housing the rotation wheel 4. The rotation wheel 4 housed in the compartment is formed by injection molding of a synthetic resin by means of a molding machine as shown in FIGS. 8 and 9. The rotation wheel 4 has a generally dish-like main surface. With the rotation wheel 4 being placed at the convex side thereof in the cartridge body 2, the upper shell 6 and the main surface of one of the first and second shutter plates 5a and 5b define together a disk compartment. The rotation wheel 4 is formed generally circular to have an annular projection 43 being upright along the peripheral edge thereof. The rotation wheel 4 has formed in the main surface thereof a second opening 44 nearly equal in size to the first opening 24 formed in the lower shell 7.

When the second opening 44 coincides with the first opening 24 in the lower shell 7, the optical disk 3 housed in the rotation wheel 4 is exposed to outside. More particularly, the second opening 44 includes an opening corresponding to the optical pickup admission opening 24a of the first opening 24 and an opening corresponding to the rotation driving opening 24b. Also, the second opening 44 is formed to be gradually wider from the center toward the periphery in order to accommodate a difference from the first opening 24 and prevent the first opening 24 from being narrowed due to any working error or installation error of the rotation wheel 4. For example, the second opening 44 is formed to have both the radial edges inclined about 1 deg. outward.

Also, along the base end of the annular projection 43, there is formed a taper portion 42 inclined toward the main surface of the rotation wheel 4 as shown in FIG. 8. The taper portion 42 supports the peripheral edge of the optical disk 3 by line contact to prevent the signal recording surface of the optical disk 3 from being scratched by plane contact with the main surface of the rotation wheel 4.

Also, outside the second opening 44, there are provided the pair of first and second shutter plates 5a and 5b as shown in FIG. 2. On this account, taper portions 44a and 44b are formed on the opposite lateral edges of the second opening 44, as shown in FIG. 9, to prevent the first and second shutter plates 5a and 5b from entering the second opening 44. Further, the rotation wheel 4 has formed thereon an engagement recess 50 in which the first shutter plate 5a is engaged when the first and second shutter plates 5a and 5b cover the first and second openings 24 and 44. The shutter plate 5a is thus prevented from going up. The engagement recess 50 is defined by a piece formed to have a generally L-shaped section and whose opening end is the lateral edge of the first opening 24.

Figure 10:
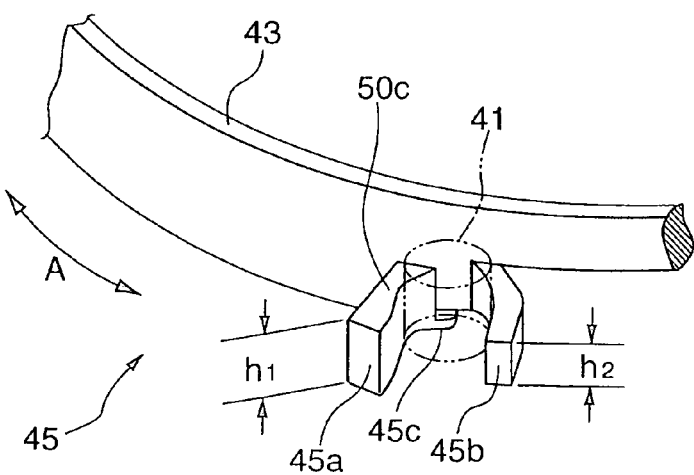
FIG. 10 is a perspective view of the substantial portion, explaining a to-be-operated member formed on the rotation wheel.

As shown in FIG. 10, near the second opening 44 in the rotation wheel 4, there is formed the to-be-operated member 45 projected to outside and in which there is engaged a shutter releasing pin 41 provided in a shutter releasing mechanism of the disk recorder and/or player. The to-be-operated member 45 includes a first piece 45a and second piece 45b. The first and second to-be-operated pieces 45a and 45b form together a concavity in which the shutter pin releasing pin 41 of the disk recorder and/or player is to be engaged. When the rotation wheel 4 is rotated in a direction in which the first and second shutter plates 5a and 5b will uncover the first and second openings 24 and 44, the shutter releasing pin 41 will abut the first to-be-operated piece 45a. When the rotation wheel 4 is rotated in a direction in which the first and second shutter plates 5a and 5b will cover the first and second openings 24 and 44, the shutter releasing pin 41 will abut the second to-be-operated piece 45b. As will further be described later, the rotation wheel 4 is forced by a forcing member 48 to rotate in the direction of arrow A in FIG. 10 in which the shutter plates 5a and 5b will uncover the first and second openings 24 and 44, and thus the first to-be-operated piece 45a is applied with a force larger than a force applied to the second to-be-operated piece 45b. On this account, the first to-be-operated piece 45a is formed larger than the second to-be-operated piece 45b to have a larger mechanical strength. More specifically, the first to-be-operated piece 45a is formed to have a height $h_1$, which is larger than a height $h_2$ of the second to-be-operated piece 45b. Thus, the first to-be-operated piece 45a has a larger mechanical strength for more positive engagement of the shutter releasing pin 41.

As the rotation wheel 4 is rotated, the to-be-operated member 45 constructed as above is exposed to outside from the front side of the lower shell 7 in which the first opening 24 is formed, and moved in the direction of the width of the first opening 24. The to-be-operated member 45 stays at the portion widened by the taper portion 24c when the shutter plates 5a and 5b are uncovering the first opening 24.

Figure 11:
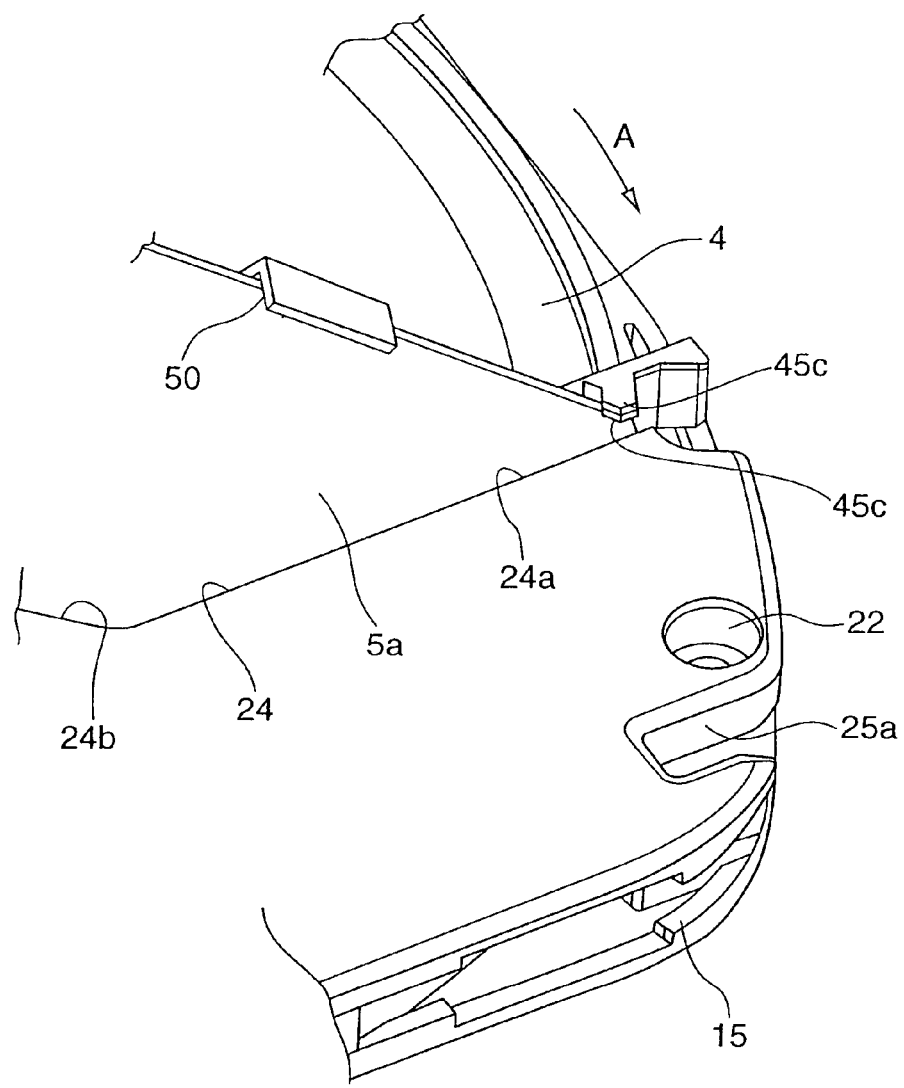
FIG. 11 is a perspective view of the substantial portion, explaining a mechanism for preventing the shutter plate from going up.

As shown in FIG. 11, the to-be-operated member 45 has also an engagement recess 45c formed at the base ends of the first and second to-be-operated pieces 45a and 45b and in which the first shutter plate 5a is engaged. While the shutter plates 5a and 5b are covering the first and second openings 24 and 44, the first shutter plate 5a is engaged in the engagement recess 45c to prevent the latter from going up or down. Therefore, there arises no clearance between the peripheral edge of the first opening 24 and the first shutter plate 5a, and thus it is possible to prevent dust or the like from invading the cartridge body 2. That is, the engagement recess 45c formed in the to-be-operated member 45 is cooperative with the engagement recess 50 formed near the second opening 44 in the rotation wheel 4 to prevent the first shutter plate 5a from going up or down. Therefore, there arises no clearance between the second opening 44 and shutter plate 5a and thus it is possible to prevent dust or the like from invading the cartridge body 2.

Note that the second to-be-operated piece 45b abuts a limiter 29 coupling the peripheral wall 8 and inner wall 11 of the upper shell 6, opposite to a part of the peripheral edge of the first opening 24 in the lower shell 7, to define a pivoting range of the rotation wheel 4.

Also, the pair of shutter plates 5a and 5 b is disposed between the rotation wheel 4 and lower shell 7. To reduce the area of contact with the shutter plates 5a and 5b, and thus the sliding resistance, a plurality of projections 46 is formed on the surface of the rotation wheel 4 on which the shutter plates 5a and 5b are disposed, as shown in FIG. 9. The projection 46 is formed circular to have a height of about 20 μm.

The rotation wheel 4 constructed as above is forced by a forcing member 48 such as a helical spring or the like to rotate in a direction in which the shutter plates 5a and 5b will cover the first and second openings 24 and 44. The forcing member 48 is hooked at one end thereof on a retention piece 48a formed on the annular projection 43 of the rotation wheel 4 and at the other end on an retention projection 48b formed on the inner surface of the upper shell 6 as shown in FIG. 4. As the rotation wheel 4 is rotated, the forcing member 48 expands and contracts. Inside the inner wall 11, there is formed a rising wall on the inner surface of the upper shell 6. Between the rising wall and peripheral wall 8, there is defined a guide recess 49 which guides the forcing member 48 which will thus gently expand and contract inside the cartridge body 2. Also, along the peripheral edge of the rotation wheel 4, there is formed a flange 47 which closes almost entirely the guide recess 49 as shown in FIGS. 8 and 9.

Figure 12:
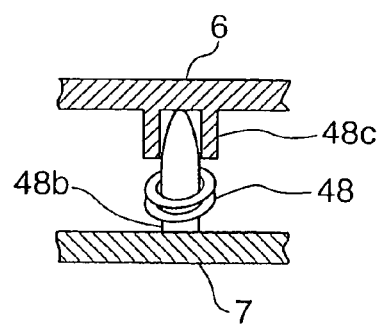
FIG. 12 is a sectional view of the substantial portion, explaining an engagement projection of a forcing member which forces the rotation wheel in one direction.

Note that as shown in FIG. 12, the retention projection 48b formed on the inner surface of the upper shell 6 is engaged at the free end thereof on a generally cylindrical reinforcing rib 48c formed on the inner surface of the lower shell 7 to reinforce the retention projection 48b which will be applied with the force of the forcing member 48 when the upper and lower shells 6 and 8 are joined to each other.

The rotation wheel 4 constructed as above is forced by the forcing member 48 such as a helical spring or the like to rotate in a direction in which the shutter plates 5a and 5b will cover the first and second openings 24 and 44, and thus the to-be-operated member 45 is rotated by the shutter releasing pin 41 at the disk recorder and/or player in a direction in which the shutter plates 5a and 5b will uncover the first and second openings 24 and 44. At this time, the inner wall 11 will guide the rotation wheel 4 being rotated.

Figure 13:
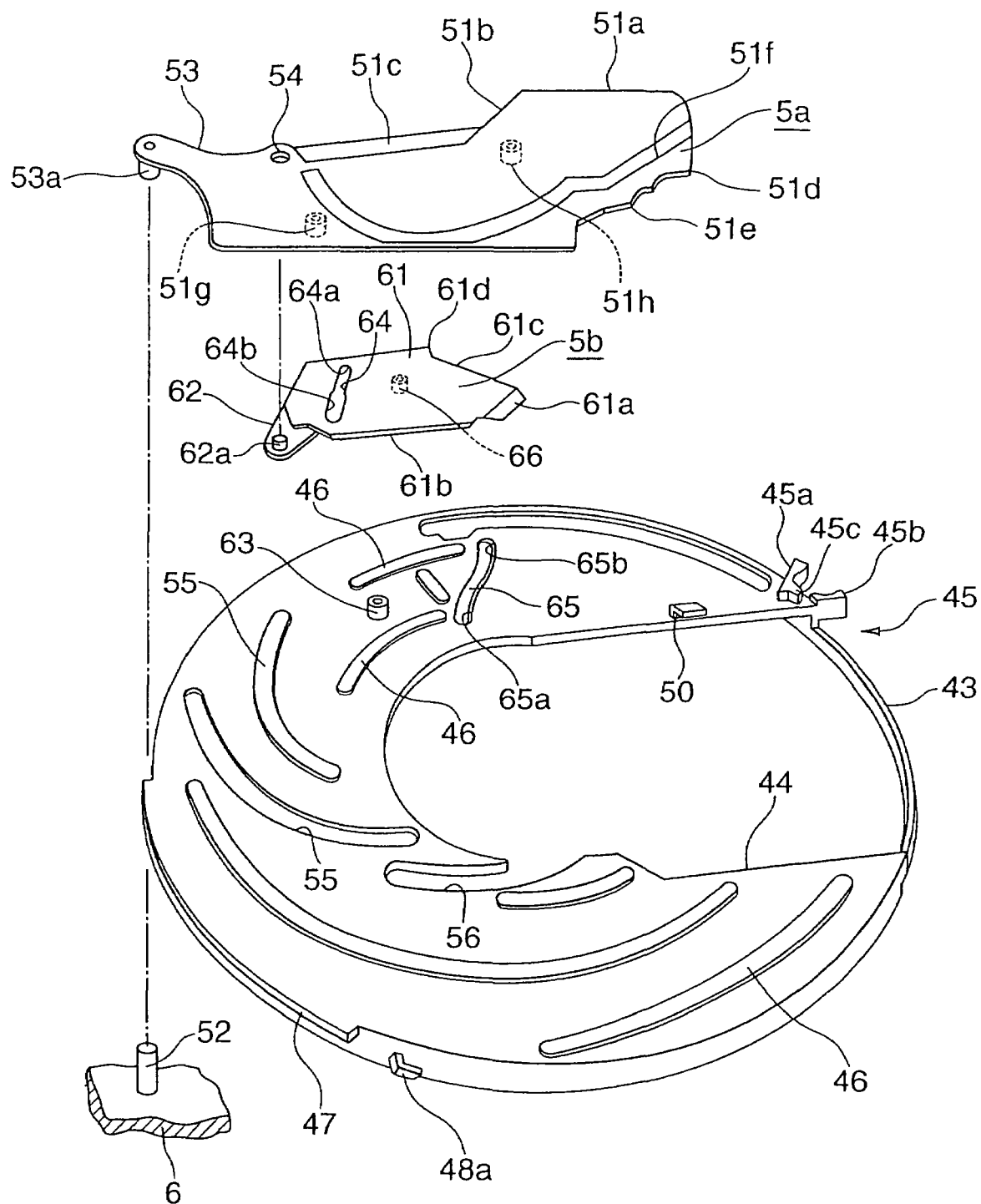
FIG. 13 is a perspective view of the shutter plates and rotation wheel.

Of the shutter plates 5a and 5b in pair provided in the shutter mechanism to uncover and cover the first opening 24 in the lower shell 7 and second opening 44 in the rotation wheel 4, the first one (plate 5a) is formed larger than the second one (5b) as shown in FIG. 13.

As shown in FIG. 13, the first shutter plate 5a includes a first shutter portion 51 which covers the first and second openings 24 and 44, a first pivoting support portion 53 supported pivotably on a first shaft 52 formed on the inner surface of the upper shell 6 and between the peripheral wall 8 and inner wall 11, and a second shaft hole 54 at which the smaller shutter plate 5b is coupled to the first shutter plate 5a.

The first shutter portion 51 includes a first lateral edge 51a positioned at one lateral edge of the second opening 44 in the rotation wheel 4 when the second opening 44 is covered, a second lateral edge 51b contiguous to the first lateral edge 51a and a third lateral edge 51c contiguous to the second lateral edge 51b. The second lateral edge 51b is formed to bend inwardly of the first lateral edge 51a, and the third lateral edge 51c is formed to bend outwardly of the second lateral edge 51b. Further, the first shutter portion 51 includes a fourth lateral edge 51d formed opposite to the first to third lateral edges 51a to 51c. The fourth lateral edge 51d has formed therein a wave-like clearance cut 51e which keeps the first shutter portion 51 off the bosses 10 and 22, location holes 26a, write-protection member, etc. formed at one corner of the upper and lower shells 6 and 7, respectively. The second and third lateral edges 51b and 51c are tapered in opposite directions, respectively. Also, the first lateral edge 51a is engaged in the engagement hole 50 in the rotation wheel 4 and thus the first shutter plate 5a is prevented from going up.

Further, on the side of the first shutter portion 51, opposite to the lower shell 7, there is formed a recess 51f in which the projection 27 formed on the peripheral edge of the first opening 24 in the lower shell 7 is engaged. When the rotation wheel 4 is lifted by the lifter 14 on the upper shell 6 to the lower shell 7 while the shutter plates 5a and 5b are covering the first and second openings 24 and 44, the projection 27 formed on the peripheral edge of the first opening 24 is engaged in the recess 51f, whereby dust or the like is prevented from invading the cartridge body 2.

Moreover, on the side of the first shutter portion 51, opposite to the optical disk 3, there is formed a guide projection 51g which is to be engaged in a guide recess 55 formed in the main surface of the rotation wheel 4. Being engaged in the guide recess 55, the guide projection 51g limits pivoting of the first shutter plate 5a. In addition, on the side of the first shutter portion 51, opposite to the optical disk 3, there is formed a limiting projection 51h which limits displacement of the shutter plate 5a. The limiting projection 51h is thus formed in a position corresponding to an inner radius-side area, not for recording signals, around the center hole 3a in the optical disk 3, and prevents the signal recording surface of the optical disk 3 from being scratched by the first shutter plate 5a accidentally pressed and displaced inwardly while the shutter plates 5a and 5b are covering the first and second openings 24 and 44. While the shutter plates 5a and 5b are uncovering the first and second openings 24 and 44, the limiting projection 51h enters an undercut 56 formed near the center in the rotation wheel 4 and will not block the pivoting of the shutter plate 5a.

Figure 14:
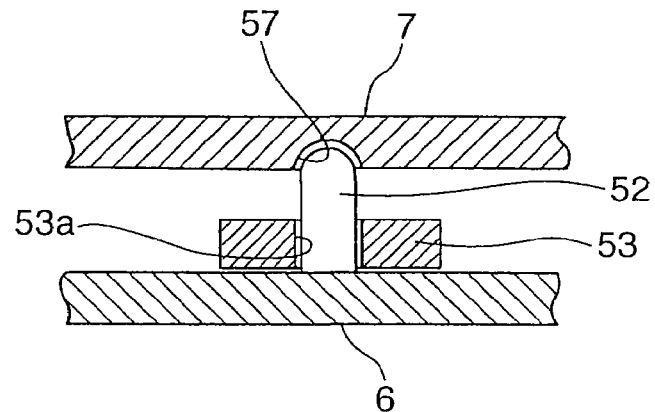
FIG. 14 is a sectional view of the substantial portion, showing a pivoting support mechanism for the first shutter plate.

The first pivoting support portion 53 of the shutter plate 5a is formed thicker than the shutter portion 51 to be more rigid, and has formed therein a first shaft hole 53a through which the first shaft 52 formed on the upper shell 6 is passed. As shown in FIG. 14, the first shaft 52 is formed to have such a height that it will project from the first pivoting support portion 53 when it is passed through the first shaft hole 53a. The free end of the first shaft 52 is engaged in a bearing portion 57 formed on the lower shell 7 to prevent the first pivoting support portion 53 from being disengaged from the first shaft 52 even if the disk cartridge is applied with an impact or shock when dropped, and reinforces the first shaft 52.

As shown in FIG. 13, the second shutter plate 5b engaged on the first shutter plate 5a constructed as above includes a second shutter portion 61 which covers the first and second openings 24 and 44 along with the first shutter portion 51, and a second pivoting support portion 62 installed in the second shaft hole 54 formed in the first shutter plate 5a.

The second shutter portion 61 includes a first lateral edge 61a which engages on the second lateral edge 51b of the first shutter portion 51, a second lateral edge 61b contiguous to the first lateral edge 61a and which engages on the third lateral edge 51c of the first shutter portion 51, and a third lateral edge 61c formed at the other side of the second lateral edge 61b and contiguous to the first lateral edge 61a. The first lateral edge 61a is tapered in a direction opposite to the tapering of the second lateral edge 51b of the first shutter portion 51, and the second lateral edge 61b is tapered in a direction opposite to the tapering of the third lateral edge 51c of the first shutter portion 51. In addition, the first and second lateral edges 61a and 61b are also tapered in opposite directions. When the shutter plates 5a and 5b cover the first and second openings 24 and 44, the second lateral edge 61b of the first shutter portion 51 is put into mesh with the taper portion of the first lateral edge 61a of the second shutter portion 61 in one direction while the taper portion of the third lateral edge 51c of the first shutter portion 51 is in mesh with the taper portion of the second lateral edge 61b of the second shutter portion 61 in a direction opposite to the above one direction. Therefore, while the pair of shutter plates 5a and 5b is covering the first and second openings 24 and 44, they are in mesh with each other to prevent dust or the like from invading the cartridge body 2 from the abutment between them and they are thus not easy to be flexed when pressed.

Also, while the shutter plates 5a and 5b are covering the first and second openings 24 and 44, the first shutter plate 5a is engaged in the engagement recess 45c of the to-be-operated member 45 formed on the rotation wheel 4 and the first lateral edge 51a of the first shutter portion 51 is engaged in the engagement recess 50, thereby preventing the first shutter plate 5a from going up or down. Therefore, there will arise no clearance between the lateral edge of the first opening 24 and the first shutter plate 5a, and hence dust or the like will be prevented from invading the cartridge body 2.

Further, a projection 61d is formed at the end of the third lateral edge 61c opposite to the first lateral edge 61a. When the second shutter plate 5b is covering the first and second openings 24 and 44, the projection 61d is engaged in an engagement recess 61e formed near the first opening 24 at the front side of the lower shell 7 to prevent dust or the like from invading the cartridge body 2 from a clearance between the first opening 24 and second shutter plate 5b.

Moreover, the second shutter portion 61 has formed thereon a first recess-shaped cam portion 64 in which there is engaged a first control projection 63 formed on the rotation wheel 4. When the first control projection 63 is engaged in the first cam portion 64, the latter controls the pivoting of the second shutter plate 5b. The first cam portion 64 includes a narrow portion 64a formed at the peripheral side of the rotation wheel 4, and a wide portion 64b formed near the center of the rotation wheel 4 and larger than the narrow portion 64a. The narrow portion 64a pivots the second shutter plate 5b in a former half of a pivoting stroke of the second shutter plate 5b uncovering the first and second openings 24 and 44. When the first control projection 63 moves to the wide portion 64b, the force of pivoting is removed from the second shutter plate 5b.

Figure 15:
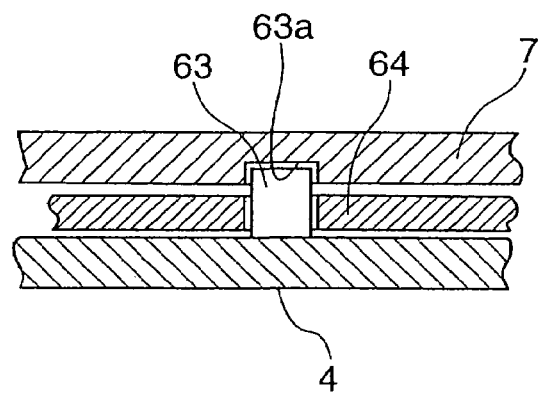
FIG. 15 is a sectional view of the substantial portion, showing a guide mechanism for the first shutter plate.

Note that the free end of the first control projection 63 formed on the rotation wheel 4 is engaged in the relief recess 63a formed in the inner surface of the lower shell 7 as shown in FIG. 15, thereby preventing the first control projection 63 from being disengaged from the first cam portion 64 due to a shock or the like.

Also, the second shutter portion 61 has formed thereon a second control projection 66 which is engaged in a second recess-shaped cam portion 65 formed in the main surface of the rotation wheel 4. The second cam portion 65 includes a first bent portion 65a bent at the center of the rotation wheel 4 in a first direction, and a second bent portion 65b bent at the periphery of the rotation wheel 4 in a second direction opposite to the bent direction of the first bent portion 65a. The first bent portion 65a will not act in any way in the former half of the pivoting stoke of the second shutter plate 5b uncovering the first and second openings 24 and 44. However, when the second control projection 66 moves to the second bent portion 65b, namely, in the latter half of the pivoting stroke of the second shutter plate 5b, the second bent portion 65b pivots the second shutter plate 5b on behalf of the aforementioned first cam portion 64.

Figure 16:
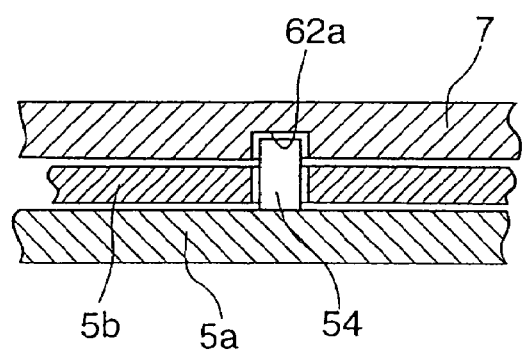
FIG. 16 is a sectional view of the substantial portion, showing a pivoting support mechanism for the second shutter plate.

The second pivoting support portion 62 has a second shaft 62a formed thereon. The second shaft 52a is passed through a second shaft hole 54 formed in the first pivoting support portion 53 of the first shutter plate 5a. Therefore, the second shutter plate 5b is pivoted not in relation to the rotation wheel 4 but in relation to the first shutter plate 5a. It should be noted that as shown in FIG. 16, the free end of the second shaft 62a projects from the second pivoting support portion 62 and is engaged in the relief recess 62b formed in the inner surface of the lower shell 7, thereby preventing the second shaft 62a from being disengaged from the second shaft hole 54 due to a shock or the like.

Figure 17:
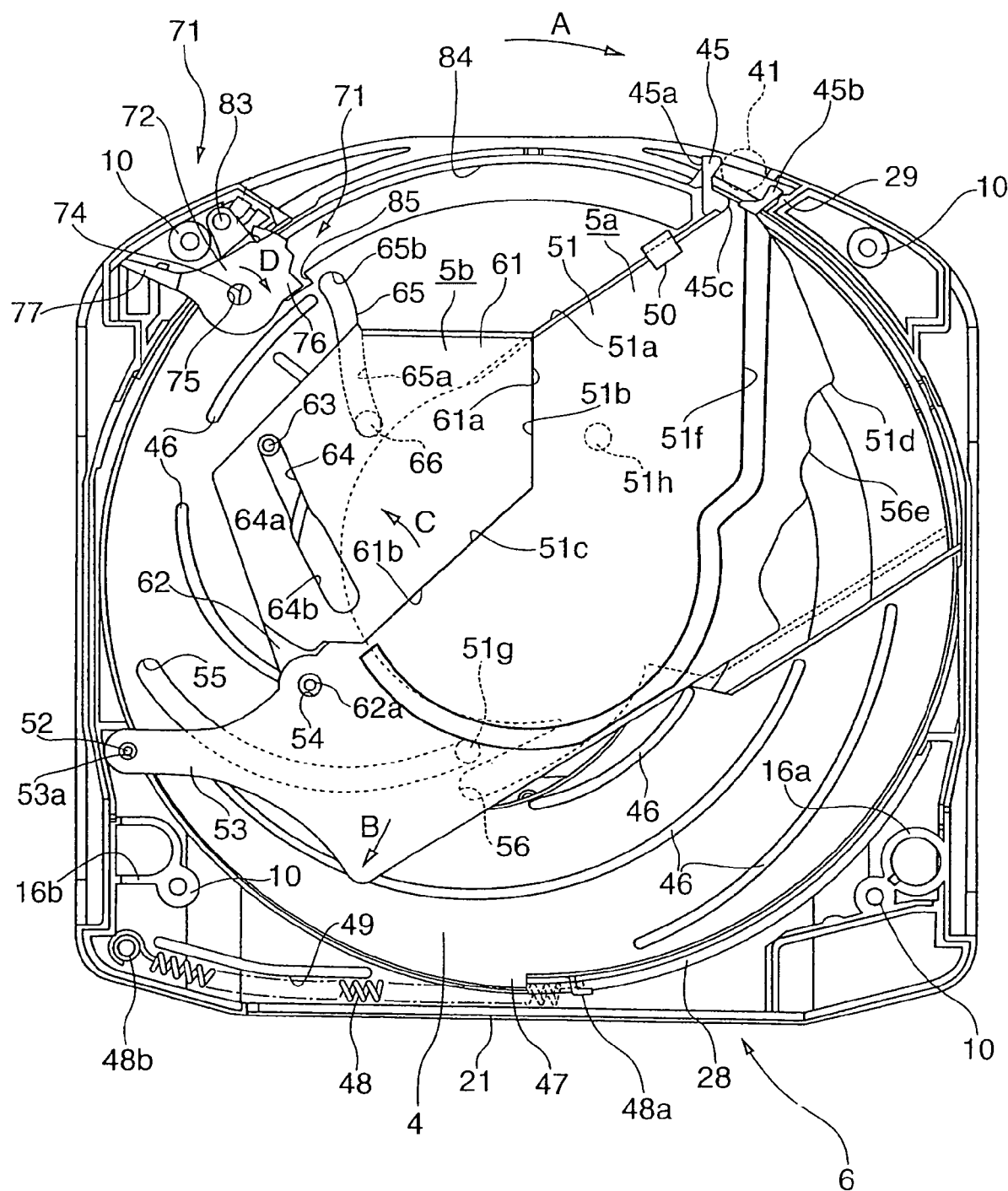
FIG. 17 is a plan view of the shutter plates covering the write and/or read opening, with the lower shell and optical disk being omitted.

Next, the rotation of the rotation wheel 4 and operation of the first and second shutter plates 5a and 5b will be described with reference to FIGS. 17 and 18. FIG. 17 shows the first and second shutter plates 5a and 5b covering the first and second openings 24 and 44. While the first and second shutter plates 5a and 5b are covering the first and second openings 24 and 44, the rotation wheel 4 is forced by the forcing member 48 to rotate in the direction of arrow A in FIG. 17 and the to-be-operated member 45 is positioned at one lateral edge of the first opening 24. The second lateral edge 51b of the first shutter portion 51 and the taper portion of the first lateral edge 61a of the second shutter portion 61 are in mesh with each other in one direction and the taper portion of the third lateral edge 51c of the first shutter portion 51 and that of the second lateral edge 61b of the second shutter portion 61 are in mesh with each other in a direction opposite to the one direction, thereby preventing dust or the like from invading the cartridge body 2 from the abutment between the shutter plates 5a and 5b and the shutter plates 5a and 5b from being easily flexed when pressed.

At this time, the guide projection 51g of the first shutter plate 5a stays at one end of the guide recess 55 in the rotation wheel 4, near the center of the latter. Also, the first control projection 63 is engaged in the narrow portion 64a of the first cam portion 64 of the second shutter plate 5b. Further, the second control projection 66 of the second shutter plate 5b is engaged in the first bent portion 65a of the second cam portion 65 of the rotation wheel 4.

When the rotation wheel 4 is rotated by the to-be-operated member 45 against the force of the forcing member 48 in a direction opposite to the direction of arrow A in FIG. 17, the first shutter plate 5a having the guide projection 51g thereof engaged in the guide recess 55 is rotated about the first shaft 52 on the upper shell 6 in the direction of arrow B in FIG. 17. As the first shutter plate 5a is pivoted, the second shutter plate 5b will be pivoted about the second shaft 62a of the first shutter plate 5a in the direction of arrow C in relation to the first shutter plate 5a. The second shutter plate 5b is initially pivoted by the narrow portion 64a of the first cam portion 64 on which there is engaged the first control projection 63 on the rotation wheel 4. It should be noted that when the second shutter plate 5b is initially pivoted as above, the first bent portion 65a of the second cam portion 65 on the rotation wheel 4, on which the second control projection 66 of the second shutter plate 5b is engaged, will not give any force of rotation to the second control projection 66.

Figure 18:
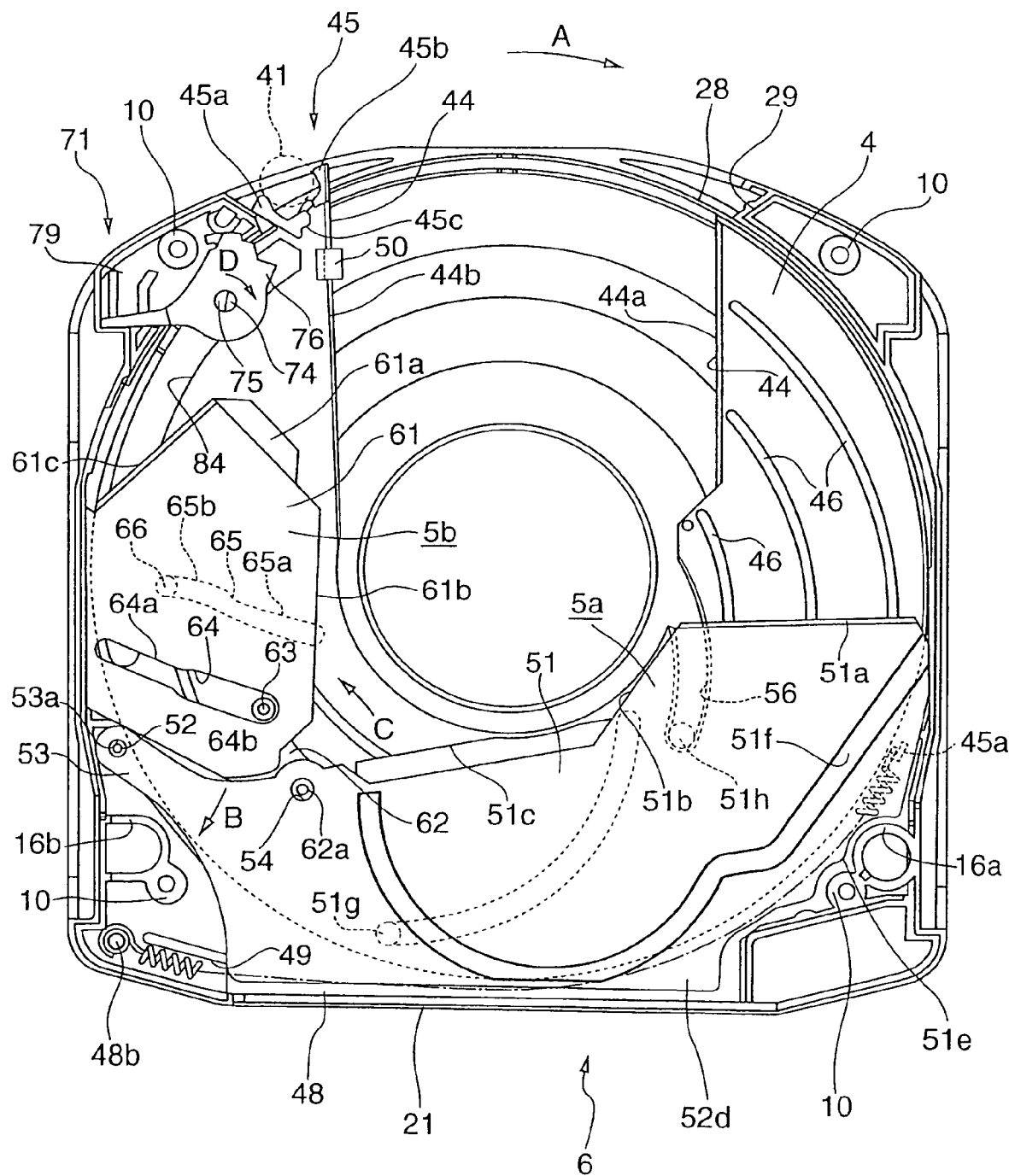
FIG. 18 is a plan view of the shutter plates uncovering the write and/or read opening, with the lower shell and optical disk being omitted.

Further, when the rotation wheel 4 is rotated in a direction opposite to the direction of arrow A, the guide projection 51g engaged in the guide recess 55 of the rotation wheel 4 is moved to the other end of the guide recess 55 at the periphery of the rotation wheel 4 as shown in FIG. 18. As the first shutter plate 5a is pivoted, the second shutter plate 5b is pivoted about the second shaft 62a of the first shutter plate 5a in the direction of arrow C in FIG. 17 in relation to the first shutter plate 5a. Then, the first control projection 63 of the rotation wheel 4 moves to the wider portion 64b of the first cam portion 64 and will no act on the second shutter plate 5b any more. Instead, the second control projection 66 of the second shutter plate 5b is moved from the first bent portion 65a to the second bent portion 65b to pivot the second shutter plate 5b in the direction of arrow C. Thus, the first and second openings 24 and 44 are uncovered to expose the optical disk 3 in the rotation wheel 4 to outside in a range between the inner and outer radii of the optical disk 3 as shown in FIG. 18.

Figure 19:
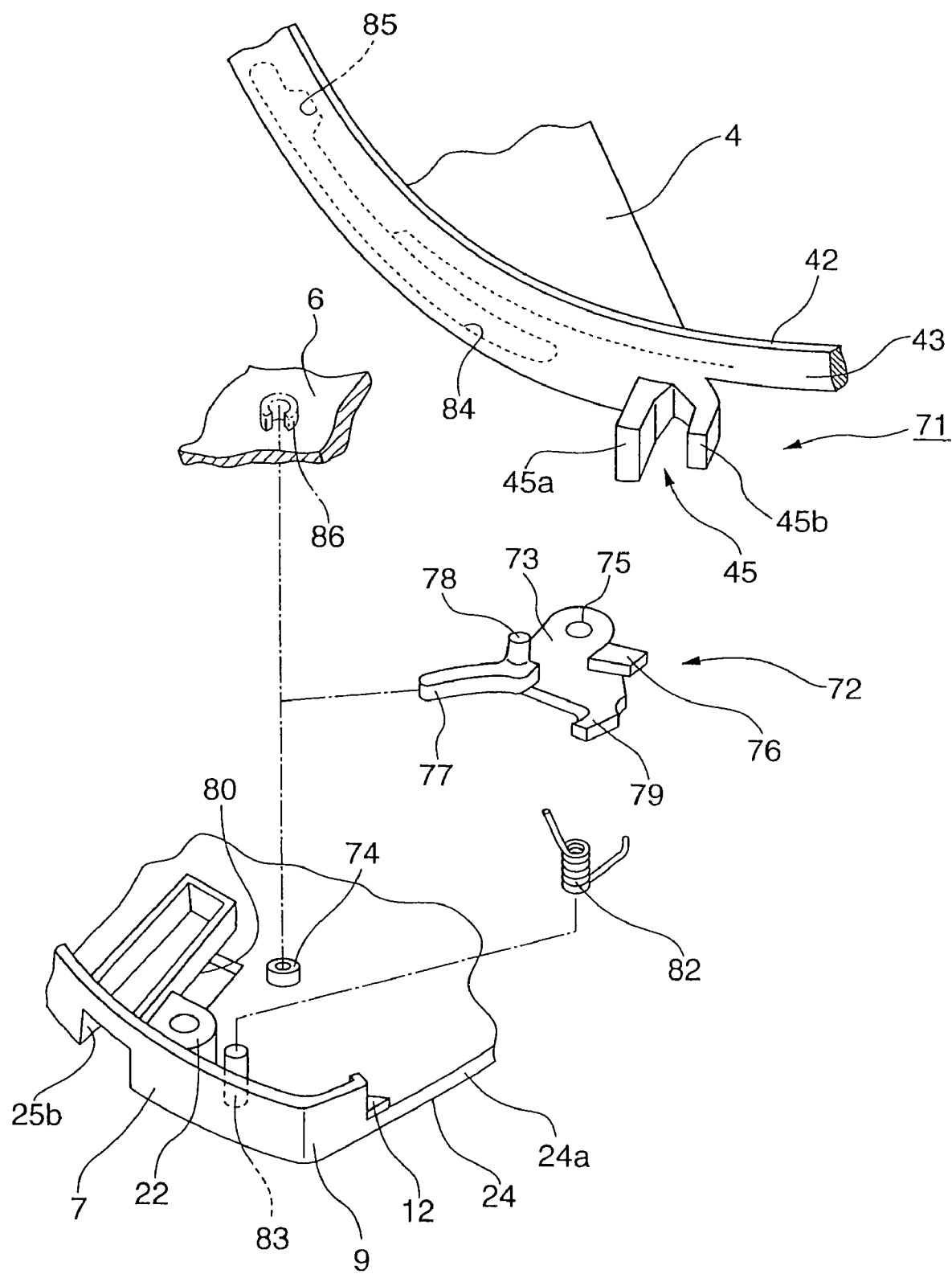
FIG. 19 is an exploded perspective view of a locking mechanism.

Note here that the cartridge body 2 has provided therein a locking mechanism 71 which locks the rotation wheel 4 against rotation, thereby keeping the first and second openings 24 and 44 covered with the shutter plates 5a and 5b as shown in FIGS. 17 and 18. More specifically, the locking mechanism 71 includes a locking member 72 which locks the rotation wheel 4, as shown in FIGS. 17, 18 and 19. The locking member 72 includes a base portion 73 having formed therein a shaft hole 75 through which there is passed a shaft 74 formed on the inner surface of the lower shell 7. Also, the base portion 73 has formed thereon a locking portion 76 which locks the rotation wheel 4 against rotation, an unlocking piece 77 which is pressed by an insertion guide pin 100 also working as an unlocking pin at the disk recorder and/or player, a pivoting limiting piece 78 which limits pivoting of the base portion 73, and an engagement piece 79 on which the forcing member is engaged at one end thereof. The locking member 72 is disposed near the insertion guide recess 25b at the side of the alignment hole 26b formed on the rear side of the lower shell 7. The locking member 72 is installed to the lower shell 7 with the shaft 74 on the lower shell 7 being passed through the shaft hole 75.

Note that also when the locking member 72 is installed to the lower shell 7, the free end of the shaft 74 projects from the base portion 73. The projecting free end of the shaft 74 is engaged in the bearing portion 86 formed on the upper shell 6 to prevent the locking member 72 from being disengaged from the shaft 74 even if a dropping shock or the like is applied, namely, reinforce the shaft 74.

As shown in FIG. 19, the locking member 72 has the locking portion 76 thereof directed inwardly, and the unlocking piece 77 thereof moved into the insertion guide recess 25b through a relief hole 80 formed in a rising wall of the insertion guide recess 25b. Also, the pivoting limiting piece 78 abuts the boss 22 contiguous to the rising wall to limit pivoting of the locking member 72.

Further, near the shaft 74 to which the locking member 72 is installed, there is formed a fixing pin 83 to which there is installed a forcing member 82 such as a torsion helical spring or the like to force the locking member 72 in one direction. The fixing pin 83 has a coil portion of the forcing member 82 wound thereon. The forcing member 82 installed on the fixing pin 83 is engaged at one arm portion thereof on the boss 22, and at the other end on an engagement piece 79 of the locking member, thereby forcing the locking member 72 in a locking direction of arrow D in FIG. 17 so that the unlocking piece 77 will be positioned at the open end of the insertion guide recess 25b.

Figure 20:
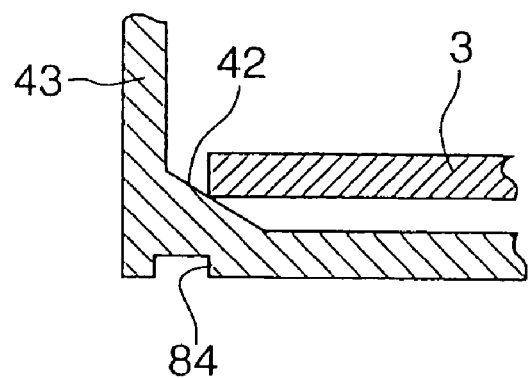
FIG. 20 is a sectional view of the substantial portion of the rotation wheel, showing the relation between a taper portion of the rotation wheel and locking recess.

The locking portion 76 of the base portion 73 is positioned slightly inwardly of the periphery of the rotation wheel 4. The rotation wheel 4 has formed therein in a position a little inner than the periphery thereof a locking recess 84 in which there is engaged the locking portion 76 projecting from the base portion 73. The locking recess 84 has an engagement concavity 85 formed therein. The engagement concavity 85 is formed to have a vertical wall at the upstream side thereof. Therefore, when the rotation wheel 4 is rotated in the direction opposite to the direction of arrow A in FIG. 17, the locking portion 76 will positively be engaged in the locking recess 84 with the vertical wall of the latter being placed to face the vertical surface of the locking portion 76. The locking portion 76 is engaged in the engagement concavity 85 to lock the rotation wheel 4 against rotation. As shown in FIG. 20, the locking recess 84 is formed below the taper portion 42 formed along the base portion of the annular projection 43 on the side of the rotation wheel 4 on which the optical disk 3 is to be received. The taper portion 42 is to support the peripheral edge of the optical disk 3 as having previously been described. The locking recess 84 is formed not deeper than necessary.

Note that the locking member 72 is formed from a synthetic resin excellent in sliding performance, such as polyacetal resin, for example, to have a lower friction resistance against the lower shell 7 and shaft 74.

Covering the first and second openings 24 and 44 with the shutter plates 5a and 5b will be described below with reference to FIG. 17. The locking member 72 is forced by the forcing member 82 to turn about the shaft 74 in the direction of arrow D in FIG. 17. At this time, the locking portion 76 is engaged in the engagement concavity 85 in the locking recess 84 formed in a position inner than the periphery of the rotation wheel 4. Therefore, the locking portion 76 is blocked against pivoting since it is engaged in the engagement concavity 85. Even if the rotation wheel 4 is applied with a force of rotating the rotation wheel 4 in the direction opposite to the direction of arrow D, the locking portion 76 will be applied with a force acting in the direction of arrow D in FIG. 17 and under which it will go into the engagement concavity 85, Therefore, the locking member 72 can positively lock the rotation wheel 4 against rotation.

Figure 21:
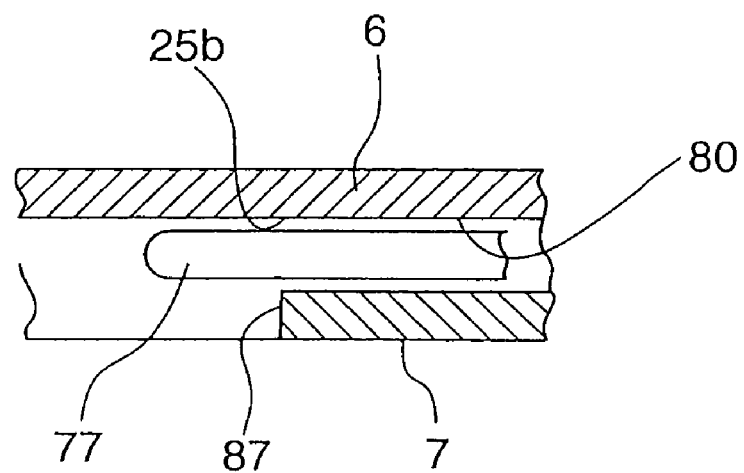
FIG. 21 is a sectional view of the substantial portion, showing the insertion guide recess to which an unlocking piece is opposite and in which an unlocking pin is not inserted.

Also, as shown in FIG. 21, the unlocking piece 77 is moved through the relief hole 80 toward the front open end in the insertion guide recess 25b, and gets ready for pressing the insertion guide pin 100 which is also the unlocking pin of the disk recorder and/or player. More specifically, the bottom of the insertion guide recess 25b is open at the front side thereof. The unlocking piece 77 is further moved from an end face 87 of the bottom of the insertion guide recess 25b toward the front open end, and gets ready to press the insertion guide pin 100 which is also the unlocking pin of the disk recorder and/or player. Since the unlocking piece 77 is thus moved into the insertion guide recess 25b, the disk recorder and/or player can be prevented from being operated incorrectly.

Figure 22:
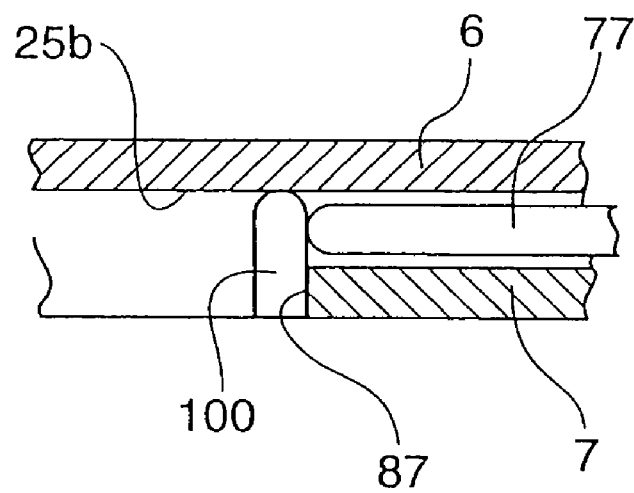
FIG. 22 is a sectional view of the substantial portion, showing the insertion guide recess in which the unlocking pin is inserted.

When the disk cartridge 1 is inserted into the disk recorder and/or player, the unlocking pin is introduced into the insertion guide recess 25b as shown in FIG. 22. When the insertion guide pin 100 also serving as the unlocking pin of the disk recorder and/or player is moved from the front open end into the insertion guide recess 25b, it will first press the unlocking piece 77, and then abut the bottom end face 87 which defines a position where the insertion guide pin 100 is to be inserted. Also, the insertion guide pin 100 will be moved into the insertion guide recess 25a as well. The unlocking piece 77 is pressed by the insertion guide pin 100 until it will abut the end face 87 which defines the position of the insertion guide pin 100. Then, the locking member 72 is pivoted about the shaft 74 in the direction opposite to the direction of arrow D against the force of the forcing member 82 as shown in FIG. 17. Therefore, the locking portion 76 is disengaged from the engagement concavity 85 in the locking recess 84, and is moved in the locking recess 84 in conjunction with the rotation of the rotation wheel 4.

Figure 23:
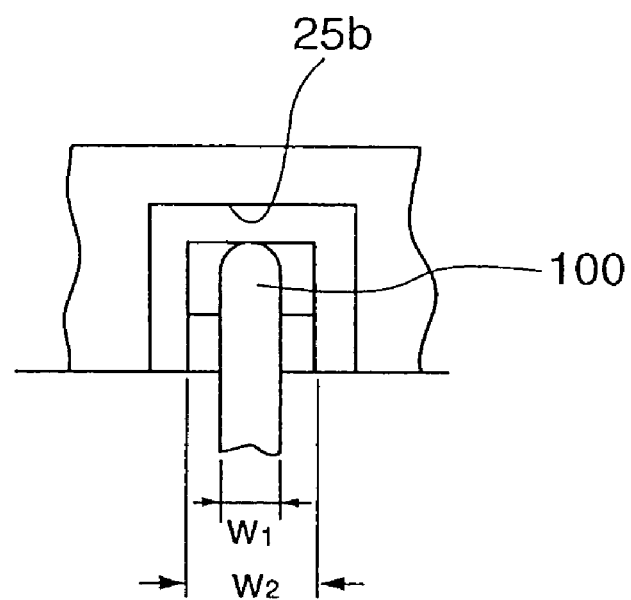
FIG. 23 is a front view of the substantial portion, showing the relation between the width of the insertion guide recess and thickness of the unlocking pin.

On the assumption that as in FIG. 23, the disk recorder and/or player has an unlocking pin 88 whose width is $W_1$ and the insertion guide recess 25b has a width of $W_2$, $W_1 \geq W_2/2$. Thus, the insertion guide pin 100 can positively press the unlocking piece 77.

The disk cartridge 1 constructed as having been described in the foregoing is in a state as shown in FIGS. 1, 2 and 17 before it is loaded into the disk recorder and/or player. More particularly, when the pair of shutter plates 5a and 5b is covering the first and second openings 24 and 44, the rotation wheel 4 is in a position to which it has been forced by the forcing member 48 to rotate in the direction of arrow D in FIG. 17 and the to-be-operated member 45 is positioned at one lateral edge of the first opening 24. As shown in FIG. 11, the engagement recess 45c in the to-be-operated member 45 cooperates with the engagement recess 50 formed, near the second opening 44, in the rotation wheel 4 to prevent the first shutter plate 5a from going up or down. Further, the second lateral edge 51b of the first shutter portion 51 is in mesh with the taper portion of the first lateral edge 61a of the second shutter portion 61 in one direction, while the tape portion of the third lateral edge 51c of the first shutter portion 51 is in mesh with that of the second lateral edge 61b of the second shutter portion 61 in a direction opposite to the one direction. That is, in the disk cartridge 1, the shutter plates 5a and 5b are thus in mesh with each other and not easily flexibly deformable and the shutter plate 5a is prevented from going up, whereby dust or the like is prevented from invading the cartridge body 2.

At this time, the guide projection 51g of the shutter plate 5a is positioned at one end, near the center, of the guide recess 55 in the rotation wheel 4. Also, the first control projection 63 is engaged in the narrow portion 64a of the first cam portion 64 of the second shutter plate 5b. Further, the second control projection 66 on the second shutter plate 5b is engaged in the first bent portion 65a of the second cam portion 65 on the rotation wheel 4. Thus, in the disk cartridge 1, the first opening 243 of the lower shell 7 is closed as shown in FIG. 2. Also, even if the first shutter plate 5a is pressed, the limiting projection 51h of the first shutter plate 5a will not abut the area at the inner radius of the optical disk 3, where no information signals are recorded, and the first shutter portion 51 will not touch the signal recording area of the optical disk 3, so the signal recording area can be prevented from being damaged.

Also, when the shutter plates 5a and 5b are covering the first and second openings 24 and 44, the rotation wheel 4 is lifted by the lifter 14 on the upper shell 6 toward the lower shell 7 so that the projection 27 formed along the peripheral edge of the first opening 24 will be engaged in the recess 51f in the first shutter portion 51, whereby dust or the like is prevented from invading the cartridge body 2.

The locking mechanism 71 will be illustrated and described herebelow. As shown in FIG. 17, the locking member 72 is forced by the forcing member 82 to turn about the shaft 74 in the direction of arrow D in FIG. 17. At this time, the locking portion 76 is engaged in the engagement concavity 85 in the locking recess 84. Therefore, as the locking portion 76 is thus engaged in the engagement concavity 85, the rotation wheel 4 is inhibited from rotating. If a force of forcibly rotating the rotation wheel 4 is applied in the direction opposite to the direction of arrow D, a force directed in the direction of arrow D in FIG. 17 is applied to the locking portion 76 which will thus be moved into the engagement concavity 85. Therefore, the locking member 72 can positively lock the rotation wheel 4 against rotation.

Also, the unlocking piece 77 is moved toward the front open end in the insertion guide recess 25b through the relief hole 80 and gets ready for pressing the insertion guide pin 100 also serving as the unlocking pin of the disk recorder and/or player as shown in FIG. 21. More specifically, the bottom of the insertion guide recess 25b is open at the front side thereof. The unlocking piece 77 is further moved from the end face 87 of the bottom of the insertion guide recess 25*b* toward the front open end, and gets ready for pressing the insertion guide pin 100 also serving as the unlocking pin of the disk recorder and/or player.

The disk cartridge 1 having been described in the foregoing is inserted first at the generally circular front side thereof into the disk recorder and/or player. When the disk cartridge 1 is inserted into the disk recorder and/or player, a pair of insertion guide pins 100 formed on the latter is inserted into the disk cartridge 1. Since the insertion guide recesses 25*a* and 25*b* are formed widest at the front open end as shown in FIG. 7, the disk cartridge 1 can positively be guided to a specific position on the cartridge mount. Also, when the width, at the innermost portion, of the insertion guide recesses 25*a* and 25*b* is generally as the same as the thickness of the insertion guide pin, the insertion guide pins 100 can accurately guide the disk cartridge 1 to the specific position on the cartridge mount in the disk recorder and/or player.

Figure 24:
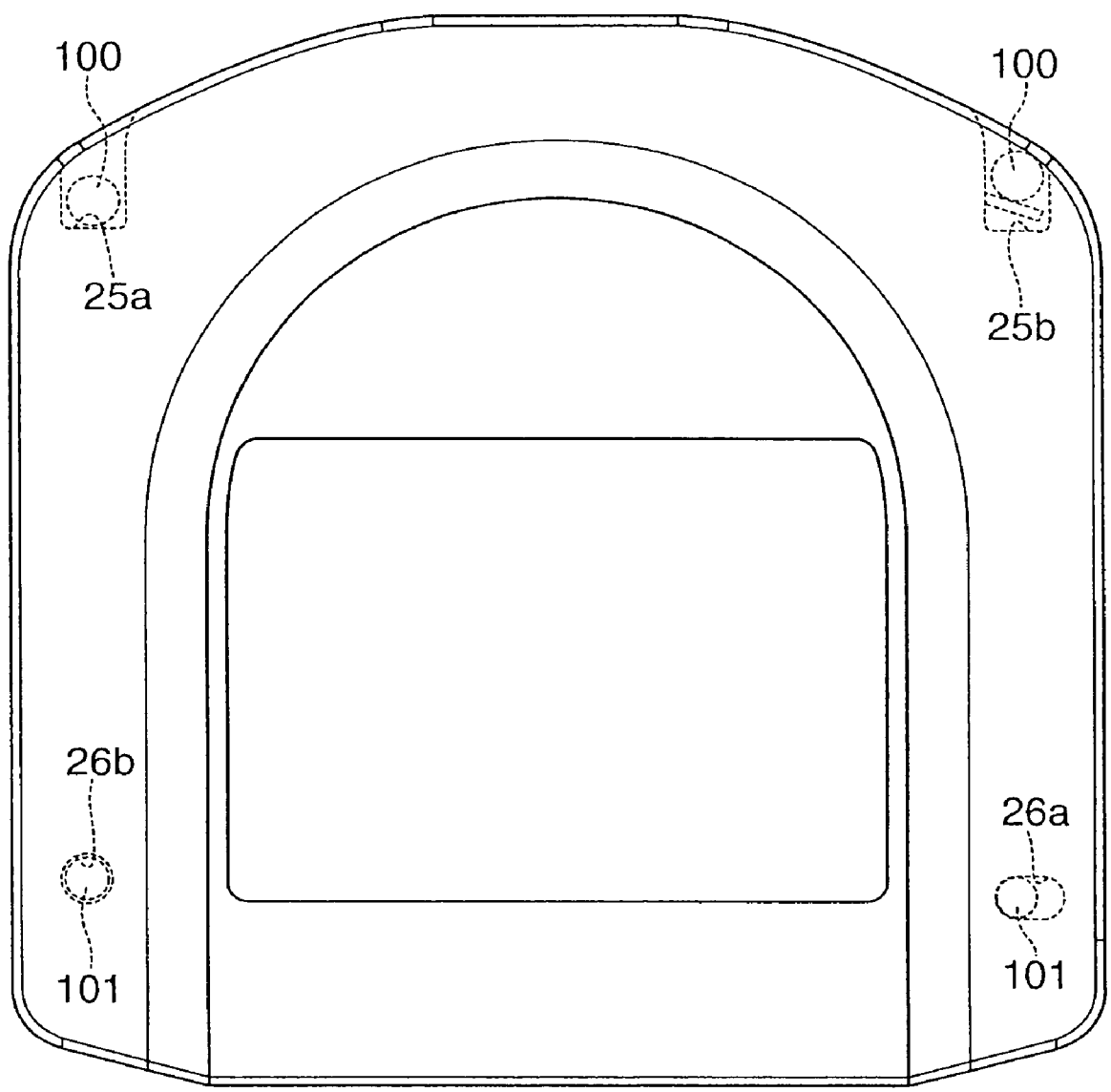
FIG. 24 is a plan view showing the relation among the insertion guide recess, location hole and alignment hole.

When the disk cartridge 1 is placed on the cartridge mount in the recorder and/or player as shown in FIG. 24, the insertion guide pins 100 are engaged in the location hole 26*a* and alignment hole 26*b*, respectively. The location hole 26*a* is a reference hole for loading the disk cartridge 1, and alignment hole 26*b* is an adjustment hole. When inserting the disk cartridge 1 into the disk recorder and/or player, the unlocking piece 77 of the locking member 72 has to be pressed against the force of the forcing member 82. On this account, the unlocking piece 77 is provided in the insertion guide recess 25*b* at the alignment hole 26*b* for enabling more accurate positioning of the disk cartridge 1 on the cartridge mount.

As the disk cartridge 1 is placed on the cartridge mount, the unlocking pin as the insertion guide pin 100 is moved into the insertion guide recess 25*b* through the front open end. It will first press the unlocking piece 77, and then abut the bottom end face 87. The unlocking piece 77 is pressed by the unlocking pin 88 until the unlocking pin 88 abuts the end face 87. Then, the locking member 72 is turned about the shaft 74 against the force of the forcing member 82 in the direction opposite to the direction of arrow D as shown in FIG. 17. Therefore, the locking portion 76 is disengaged from the engagement concavity 85 in the locking recess 84, and the rotation wheel 4 gets ready for rotation.

When the disk cartridge 1 is placed on the cartridge mount in the disk recorder and/or player, the rotation wheel 4 is rotated by the to-be-operated member 45 against the force of the forcing member 48 in the direction opposite to the direction of arrow A, and then the first shutter plate 5*a* having the guide projection 51*g* thereof engaged in the guide recess 55 in the rotation guide 4 is pivoted about the first shaft 52 on the upper shell 6 in the direction of arrow B in FIG. 17. As the first shutter plate 5*a* is thus pivoted, the second shutter plate 5*b* is pivoted about the second shaft 62*a* on the first shutter plate 5*a* in relation to the first shutter plate 5*a* in the direction of arrow C in FIG. 17. The second shutter plate 5*b* is initially pivoted by the narrow portion 64*a* of the first cam portion 64 on which the first control projection 63 on the rotation wheel 4 is engaged. It should be noted that when the second shutter plate 5*b* is initially pivoted as above, the first bent portion 65*a* of the second cam portion 65 on the rotation wheel 4 on which the second control projection 66 on the second shutter plate 5*b* is engaged will not act in any way.

Figure 25:
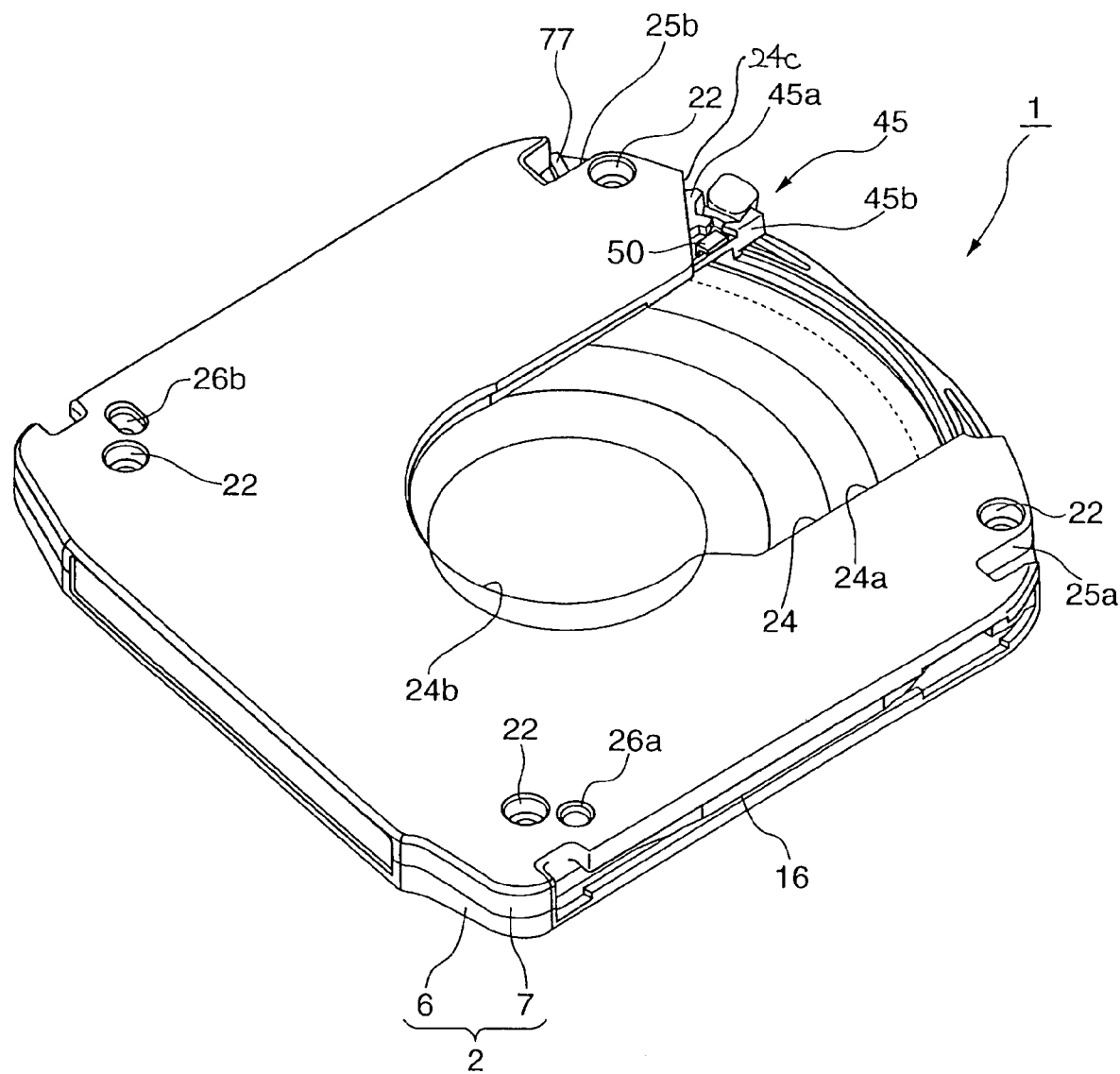
FIG. 25 is a perspective view of the disk cartridge with the first opening being uncovered.

Further, as the rotation wheel 4 is rotated in the direction opposite to the direction of arrow A in FIG. 18, the guide projection 51*g* engaged in the guide recess 55 in the rotation wheel 4 is moved to the other end of the guide recess 55 along the periphery of the rotation wheel 4. As the fist shutter plate 5*a* is pivoted, the second shutter plate 5*b* is pivoted about the second shaft 62*a* on the first shutter plate 5*a* in relation to the first shutter plate 5*a* in the direction of arrow B in FIG. 18. Then, the first control projection 63 on the rotation wheel 4 moves to the wide portion 64*b* of the first cam portion 64 and will not act on the second shutter plate 5*b* any more. Instead, the second control projection 66 on the second shutter plate 5*b* moves from the first bent portion 65*a* to the second bent portion 65*b* to pivot the second shutter plate 5*b* in the direction of arrow C in FIG. 18. Thus, the to-be-operated member 45 is positioned at the portion widened by the taper portion 24*c* of the first opening 24, the first and second openings 24 and 44 are uncovered as shown in FIG. 25, and thus the optical disk 3 housed in the rotation wheel 4 is exposed to outside in a range between the inner and outer radii of the optical disk 3.

Then, the optical disk 3 housed rotatably in the rotation wheel 4 has the center hole 3*a* thereof engaged on the disk table of the disk rotation driving mechanism in the disk recorder and/or player, is held between the clamping plate 13 provided on the upper shell 6 and the disk table, and gets ready for rotation on the disk table.

For writing information signals to the optical disk 3 or reading information signals from the optical disk 3, the optical disk 3 is rotated on the disk table at CLV (constant linear velocity), CAV (constant angular velocity) or a combination of these velocities. Along with this operation, the optical pickup having moved into the first and second openings 24 and 44 writes information signals to the optical disk 3 or reads information signals recorded on the optical disk 3 by emitting a light beam of about 400 nm in wavelength from a semiconductor laser, condensing it by an objective lens, and irradiating it onto the signal recording surface of the optical disk 3, and detecting a return light from the signal recording surface.

Note that when the disk cartridge 1 is ejected from the disk recorder and/or player, the rotation wheel 4 is forced by the forcing member 48 to rotate in the direction of arrow D in FIG. 18, and returns from the state in FIG. 18 to the state in FIG. 17. Then, the locking portion 76 of the locking member 72 is moved in the locking recess 84 and engaged in the engagement concavity 85, and the first and second openings 24 and 44 are thus covered again.

In the foregoing, the present invention has been described concerning the small disk cartridge 1 as an embodiment thereof. However, the present invention is not limited to this embodiment but may be applied to the disk cartridge of the standard size as disposed in the aforementioned Japanese Unexamined Patent Application Publication.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A disk cartridge, comprising:
   a cartridge body including a lower shell having formed therein a first opening for write and/or read and an upper shell butt-joined to the lower shell;
   a rotation wheel housed rotatably in the cartridge body and which houses a disk and has formed therein a second opening corresponding to the first opening and through which the housed disk is exposed to outside, the rotation wheel including a control projection; and a shutter mechanism provided between the lower shell and rotation wheel and including a pair of shutter plates which are pivoted in conjunction with the rotation of the rotation wheel and which uncovers the first and second openings when the latter coincide with each other, one of said pair of shutter plates including a cam groove configured to receive the control projection of the rotation wheel, the rotation wheel having formed therein an engagement recess in which at least one of the shutter plates is engaged.

2. The disk cartridge according to claim 1, wherein the rotation wheel has formed therein a to-be-operated member in which a shutter releasing member of a disk recorder and/or player is engaged.

3. The disk cartridge according to claim 1, further comprising a forcing member engaged at one end thereof on the cartridge body while being engaged at the other end on the rotation wheel and which forces the rotation wheel in a direction in which the shutter mechanism will cover the second opening.

4. The disk cartridge according to claim 1, wherein the cam groove includes a wide portion and a narrow portion.

5. The disk cartridge according to claim 1, wherein the rotation wheel includes a guide groove for slidably receiving a guide projection on one of the pair of shutter plates.

6. The disk cartridge according to claim 5, wherein a first shutter plate includes the guide projection and a second shutter plate includes the cam groove.

7. The disk cartridge according to claim 1, wherein one of the pair of shutter plates includes a limiting projection configured to abut a non-writing portion of the disk when the shutter plates cover the first opening, said limiting projection configured to prevent contact of the shutter plates with a writing portion of the disk when the shutter plates cover the first opening.

8. The disk cartridge according to claim 7, wherein the rotation wheel includes an undercut configured to slidably receive the limiting projection when the shutter plates expose the first opening.

9. The disk cartridge according to claim 1, wherein one of the pair of shutter plates includes a recess configured to receive a projection formed on the lower shell.

10. The disk cartridge according to claim 1, wherein the lower shell includes a recess configured to receive the control projection after the control projection is inserted in the cam groove.

11. A disk cartridge, comprising:

a cartridge body including a lower shell having formed therein a first opening for write and/or read and an upper shell butt-joined to the lower shell;

rotation means for rotatably housing a disk, said rotation means having formed therein a second opening corresponding to the first opening and through which the housed disk is exposed to outside, the rotation means including a control projection; and first and second shutter means for uncovering the first and second openings when the latter coincide with each other, one of said first and second shutter means including a cam groove configured to receive the control projection of the rotation means, the rotation means having formed therein an engagement recess in which at least one of the first and second shutter means is engaged.

12. The disk cartridge according to claim 11, wherein the rotation means has formed therein a to-be-operated member in which a shutter means releasing member of a disk recorder and/or player is engaged.

13. The disk cartridge according to claim 11, further comprising a forcing member engaged at one end thereof on the cartridge body while being engaged at the other end on the rotation means and which forces the rotation means in a direction in which the first and second shutter means will cover the second opening.

14. The disk cartridge according to claim 11, wherein the cam groove includes a wide portion and a narrow portion.

15. The disk cartridge according to claim 11, wherein the rotation means includes a guide groove for slidably receiving a guide projection on one of the first and second shutter means.

16. The disk cartridge according to claim 15, wherein the first shutter means includes the guide projection and the second shutter means includes the cam groove.

17. The disk cartridge according to claim 11, wherein one of the first and second shutter means includes a limiting projection configured to abut a non-writing portion of the disk when the first and second shutter means cover the first opening, said limiting projection configured to prevent contact of the first and second shutter means with a writing portion of the disk when the first and second shutter means cover the first opening.

18. The disk cartridge according to claim 17, wherein the rotation means includes an undercut configured to slidably receive the limiting projection when the first and second shutter means expose the first opening.

19. The disk cartridge according to claim 11, wherein one of the first and second shutter means includes a recess configured to receive a projection formed on the lower shell.

20. The disk cartridge according to claim 11, wherein the lower shell includes a recess configured to receive the control projection after the control projection is inserted in the cam groove.

* * * * *